United States Patent [19]
Horvitz et al.

[11] Patent Number: 6,016,145
[45] Date of Patent: Jan. 18, 2000

[54] METHOD AND SYSTEM FOR TRANSFORMING THE GEOMETRICAL SHAPE OF A DISPLAY WINDOW FOR A COMPUTER SYSTEM

[75] Inventors: Eric J. Horvitz, Kirkland; Michael E. Markley, Redmond; Martin L. Sonntag, Kirkland, all of Wash.

[73] Assignee: Microsoft Corporation, Redmond, Wash.

[21] Appl. No.: 09/262,108

[22] Filed: Mar. 4, 1999

Related U.S. Application Data

[62] Division of application No. 08/649,828, Apr. 30, 1996.

[51] Int. Cl.[7] ........................................................ G06F 3/14
[52] U.S. Cl. ............................ 345/342; 345/340; 345/355
[58] Field of Search ..................................... 345/340, 333, 345/341, 334–335, 339, 342–347, 348–349, 352–355, 350–351, 356–357, 113, 114–120

[56] References Cited

U.S. PATENT DOCUMENTS

| | | | |
|---|---|---|---|
| 5,204,944 | 4/1993 | Wolberg et al. | 395/127 |
| 5,510,838 | 4/1996 | Yomdin et al. | 348/384 |
| 5,524,200 | 6/1996 | Orton et al. | 345/340 |
| 5,546,520 | 8/1996 | Cline et al. | 345/340 |
| 5,652,851 | 7/1997 | Stone et al. | 345/346 |
| 5,670,984 | 9/1997 | Robertson et al. | 345/139 |
| 5,671,381 | 9/1997 | Strasmick et al. | 345/355 |
| 5,724,492 | 3/1998 | Matthews, III et al. | 395/119 |
| 5,771,032 | 6/1998 | Cline et al. | 345/127 |
| 5,786,820 | 7/1998 | Robertson | 345/357 |
| 5,790,713 | 8/1998 | Kamada et al. | 382/285 |
| 5,801,704 | 9/1998 | Oohara et al. | 345/348 |

OTHER PUBLICATIONS

"The Perspective Wall: Detail and Context Smoothly Integrated", Jock D. Mackinlay, George G. Robertson, and Stuart K. Card, *Association for Computing Machinery*, 1991, pp. 173–179.

"The Information Visualizer, An Information Workspace", Stuart K. Card, George G. Robertson, and Jock D. mackinlay, *Association for Computing Machinery*, 1991, pp. 181–188.

"Cone Trees: Animated 3D Visualizations of Hierarchical Information", George G. Robertson, Jock D. Mackinlay, and Stuart K. Card, *Association for Computing Machinery*, 1991, pp. 189–194.

"Information Visualization Using 3D Interactive Animation", George G. Robertson, Jock D. Mackinlay, and Stuart K. Card, *Communications of the ACM*, Apr. 1993, vol. 36, No. 4, pp. 57–71.

"Rooms: The Use of Multiple Virtual Workspaces to Reduce Space Contention in a Window–Based Graphical User Interface", D. Austin Henderson, Jr. and Stuart K. Card, *ACM Transactions on Graphics*, Jul. 1986, vol. 5, No. 3, pp. 210–243.

*Primary Examiner*—Steven Sax
*Attorney, Agent, or Firm*—Jones & Askew, LLP

[57] ABSTRACT

Controlling the size of sides defining the area of a window presenting an enclosed area for displaying information on a display screen of a computer system. A transformation control can be presented on the display screen. This transformation control can be used to transform a window having a first geometrical shape to a window having a second geometrical shape. The window is transformed to the second geometrical shape in response to selection of the first transformation control. This transformation of the window is completed by adjusting the window sides, which define the presentation area for displaying information.

13 Claims, 22 Drawing Sheets

METHOD AND SYSTEM FOR TRANSFORMING THE GEOMETRICAL SHAPE OF A DISPLAY WINDOW FOR A COMPUTER SYSTEM

STATEMENT REGARDING RELATED APPLICATIONS

This is a divisional of U.S. patent application Ser. No. 08/649,828, entitled "Display System and Method for Displaying Windows of an Operating System to Provide a Three-Dimensional Workspace for a Computer System," filed Apr. 30, 1996, and currently pending.

FIELD OF THE INVENTION

The present invention relates generally to a display system for managing and manipulating information on a computer display screen operating in a window display environment, and more particularly, relates to a display system for managing and manipulating the displayed windows of the operating system to provide a virtual three-dimensional workspace for the computer system.

BACKGROUND OF THE INVENTION

In a physical environment, such as on a desk or table, an individual may utilize certain areas for placement of documents for convenient viewing. The surface area on the desk used to support the documents for viewing may be termed a workspace. Because the physical space on a desk for working is limited multiple documents may be spread out or arranged in some systematic manner within the workspace. When multiple documents require more surface area than the available area of the workspace, documents may be stacked, within the workspace, with identifying portions being visible.

In a computer system, the workspace for viewing documents or applications is the display screen or monitor of the computer system. The operating system of the computer system generally manages or controls the documents or applications displayed on the monitor. Early computer systems displayed only one document or application on the display screen at a time, therefore limiting the effective computer workspace. In order to switch among multiple applications or documents, the user had to close the application or document being displayed and open a different application or document. Such a computer system was cumbersome. With the introduction of multi-tasking and graphical interfaces, the display screen was divided into multiple portions generally referred to as windows. A window is a portion of the display screen that may contain its own document or message.

In window-based programs, the screen can be divided into several windows, each of which has its own boundaries and can contain a different document. The operating system controls these specially delineated window areas of the screen. Each window can act independently, as if it were a virtual display device. In window display environments, the windows may be resized and moved around on the display screen. Thus, with the advent of window-based programs, the computer screen workspace became more flexible. The ability to resize and move windows as well as to overlay or stack windows on top of each other essentially provided the same type of workspace available on a physical two-dimensional tabletop workspace except on a smaller scale.

Present day computer systems often employ "object-oriented" displays with windows, icons, pictures, text, pop-up or drop-down menus, dialog boxes, and other graphical items or objects in what is known as a "Graphical User Interface" ("GUI"). In such systems, various combinations of graphical items or objects are utilized to convey information to users via the monitor or display. Users interact with the computer system by activating graphical items or objects on the display. The graphical items or objects are often activated by pointing at them with a cursor controlled by a mouse or pen and clicking a control button on the mouse or pen.

An example of a computer graphical user interface that uses icons and windows is the Microsoft "WINDOWS"™ operating system manufactured and sold by the assignee of the present invention, Microsoft Corporation. Common user interfaces such as those found in the Microsoft "WINDOWS" operating system and other GUI-based computer systems typically rely on a keyboard and a pointing device with buttons such as a mouse or trackball for user interaction. The user points to a location on the screen where an action is desired, and invokes a command by pressing a button on the pointing device or entering a keyboard command.

Just as a physical desktop table can become cluttered when multiple documents are being viewed, a computer screen workspace can become cluttered when multiple documents are displayed in multiple windows. With limited working space or viewing area on a computer screen, the computer screen workspace can quickly become cluttered if several applications or windows are opened at the same time. A number of techniques have been used for overcoming the small-screen problem presented when using computer displays.

Four general categories of computer screen workspace enhancement techniques are: (1) alternating screen uses, (2) distorted views, (3) large virtual workspaces, and (4) multiple virtual workspaces. Alternating-screen use is similar to windows in that the user can switch or change the allocation of screen space from one application to another. Some early alternating screens use techniques only allowed one application to be visible on a screen at a time. With distorted views, documents or applications appearing on the screen may be distorted to small icons. Here, applications are reduced to small pictures or icons that remind the user of the original window. Overlapping or stacked windows may also be considered a distorting technique. As noted above, when many windows overlap the appearance on a display screen may become cluttered.

With large virtual workspaces, the set of objects, the documents, or applications are organized as a large virtual workspace which cannot all be viewed on a display screen simultaneously. In one example application, the data is arranged in two dimensions, and the user has three screens, one for an overview of the whole space, one for a detailed view of some portion of the space, and one touch screen for control. Head-mounted displays, which monitor user head and body movements to give the user a complete simulated three-dimensional space view, are forms of large virtual workspaces. A problem with a single large workspace is that only a limited number of things can be adjacent to any object. The space required for the objects and their shapes constrains the manner in which the space may be arranged and how densely packed documents or data can be presented. Multiple virtual workspaces provide geometrically-oriented workspaces linked together in which a project may contain a number of views and, when active, covers the entire screen. For example, when a user maneuvers close enough to a port, the user is swept into another workspace or subworkspace.

The above techniques are examples of display systems which try to overcome the limited workspace inherent with computers that display multiple applications or documents on a two-dimensional display screen. However, these display systems do not provide a method for displaying multiple applications presented by an operating system in three dimensions. Thus, there is a need in the art for a display system which provides an enhanced system for displaying multiple applications or windows as simulated three-dimensional objects on a computer display screen.

SUMMARY OF THE INVENTION

Generally described, the present invention provides a three-dimensional virtual workspace for a window based display system. The display system of the present invention is an isometric display system for an operating system. The isometric display system provides a display with monocular depth cues by making automatic sizing and geometric transformations on two dimensional rectangles that define traditional windows.

The isometric display system performs geometric transformation operations on rectangular windows to convey the impression to the user that the windows are positioned in a three-dimensional space. The impression of depth and of working in a three-dimensional space are created by transforming two-dimensional windows to appear as if the two-dimensional windows are embedded at orientations and positions in a three-dimensional isomeric space. The isometric display system responds to user activation of control buttons by transforming the shape and orientation of windows consistent with the defined three-dimensional space.

More particularly described, the present invention provides a method of utilizing left, right, front, back, upper, and lower planes. These planes define a polyhedron and these planes may be referred to as "boundary planes". The polyhedron surrounds a three-dimensional space used by the isometric display system to manage the configuration and position of windows containing data from applications. The boundary planes of the virtual space are preferably organized into a rectangular prism defining left, right, front, and back walls, a ceiling, and a floor of a four-sided room as seen when viewing the room from the outside through a selected wall or user viewpoint.

Boundary planes may be explicitly displayed with shaded solid surfaces or simply as lines defining the intersection of planes. However, the planes are preferably not visible. The front boundary plane is typically assumed to be the front surface of the display, closer to the user than the rear boundary plane. When the boundary planes are made visible, the left and right walls, and the ceiling and floor defined by the planes narrow in dimension as viewed from the front to back of the space defined on the display screen. Windows may be oriented and displayed in the boundary planes.

Windows oriented in the front boundary plane are displayed without transformation, and appear as standard rectangular window, as in traditional windowing systems. When a transformation command is entered by a user or from a program, a window is transformed and moved to the selected plane of the display system to create the perception of depth. A window selected for display on the rear plane appears as a rectangular window that has been pushed back in the three-dimensional space. A window designated for another plane is rotated 90 degrees and appears pushed flat against the designated plane.

For generating the illusion of moving the windows away from the user in the three-dimensional space, the display system decreases the size of the window and its contents equivalently in the x and y dimensions, as a function of its assigned distance from the user in the three-dimensional space. The display system moves the window towards the center of the space based on the relative distance between the front and the rear boundary planes. When a window on the front plane is moved toward the rear plane, the window can snap immediately to the rear plane and appear in a reduced size or the window may move incrementally to an intermediate plane or planes between the front and rear plane. Additionally, a window moved toward the rear plane may continuously decrease in size as the window approaches the rear plane.

User or system accessible controls are used for displaying or hanging an untransformed window on a left, right, rear, upper, or lower boundary plane. For example, when a user invokes the "perspective-transform right" command, the display system applies a perspective transform on the rectangular window and its contents and redisplays the rectangular window as an appropriately sized and shaped trapezoid. The window as displayed appears to be rotated 90 degrees form its initial position and appears to be repositioned to fit within the right boundary plane. When a window is moved along or to a boundary plane, the window may be continuously resized based on its position in the three-dimensional space or the window may snap to predefined locations.

When the intended destination of a selected window is a boundary plane already containing a transformed window, the selected window is placed on an adjacent plane to the boundary plane that is closest to the boundary plane. Adjacent planes refer to planes that are parallel (in the three-dimensional space) to the boundary plane but that are positioned at selected increments away from the boundary plane along the normal vector from the plane towards the center of the virtual space. Windows selected for display on a designated plane are displayed on the closest available adjacent plane. This provides an ordering of displayed windows from the center of the three-dimensional space to the boundary plane for all transformed windows on the boundary plane. The contents of displayed windows may be generally viewed in full when the windows are hung on different planes. Also, the windows may have focus or be operated on when displayed or hung on a plane.

Three primary controls may be used to position a window hung on a plane: push back, perspective-transform right, and perspective-transform left. Push back causes a window to be transformed or pushed to the foreground or background of the display system. Perspective-transform right generally causes a window to be displayed on the right plane and perspective-transform left generally causes a window to be displayed on the left plane. Alternatively, a single transformation control for transforming windows to the various planes may be implemented. Upon selection of the single transformation control, the display system provides a pointer to a selected plane. The pointer may be operative to point to a plurality of predefined planes. The pointer may be a direction arrow. Generally, the pointer is provided when the cursor control is activated or pulled in the direction of a predefined plane while the cursor is positioned on the transformation control. The user may release the cursor control to initiate the transfer or transformation of the window.

The operating system utilized in connection with the present invention receives data from an operating system, an application or other source for display in a window. The data may be stored by the operating system in the same manner as in rectangular windows. Before displaying the data in a window on the display screen, the operating system scales the shape of the window to fit the selected plane and the data presented in the window. The scaling of the window's shape and the scaling of the data presented in pixel coordinates within the window creates a three-dimensional appearance on the display screen.

Transformation matrices may be used in the operating system to transform or scale a window to the selected plane. When a user indicates that a window should be displayed on a particular plane, both the coordinates of the window and data contained in the window are multiplied by a transformation matrix to fit the window in the area defined by the selected plane and transform the data content of the window. By transforming the window and data, depth perception for the window is created.

The present invention may also provide a method of dynamically sizing the cursor as a function of the location of the cursor on the display screen. The present invention may determine the position of the cursor on the display screen, and resize the cursor based upon the location of the cursor on the display screen. The size of the cursor may change when the cursor crosses over a border of a window. The size of the cursor may specifically change relative to the cursor location on a window to reflect the depth of that location in three-dimensional space defined by the transformed windows. This serves to give feedback to the user about the location of the cursor in three-dimensional space by generating the perception that the cursor resides on or jumps to planes defined by the transformed windows.

Thus, it is an object of the present invention to provide an enhanced display system for displaying applications and documents in a computer system.

It is another object of the present invention to manipulate the displayed windows to create a virtual three-dimensional workspace on the monitor of the computer system.

It is another object of the present invention to provide a display system for simultaneously displaying multiple applications and objects managed by the operating system as a consistent three-dimensional operating environment.

It is another object of the present invention to transform the shapes and contents of a displayed window to create a perspective view of the window and its contents.

It is another object of the present invention to partition the display screen of a display monitor into multiple planes for displaying selected windows in a preselected form.

It is another object of the present invention to dynamically size a cursor relative to the location of the cursor on the display screen.

These and other objects, features, and advantages of the present invention will become apparent from reading the following description in conjunction with the accompanying drawings.

DETAILED DESCRIPTION

Figure 1:
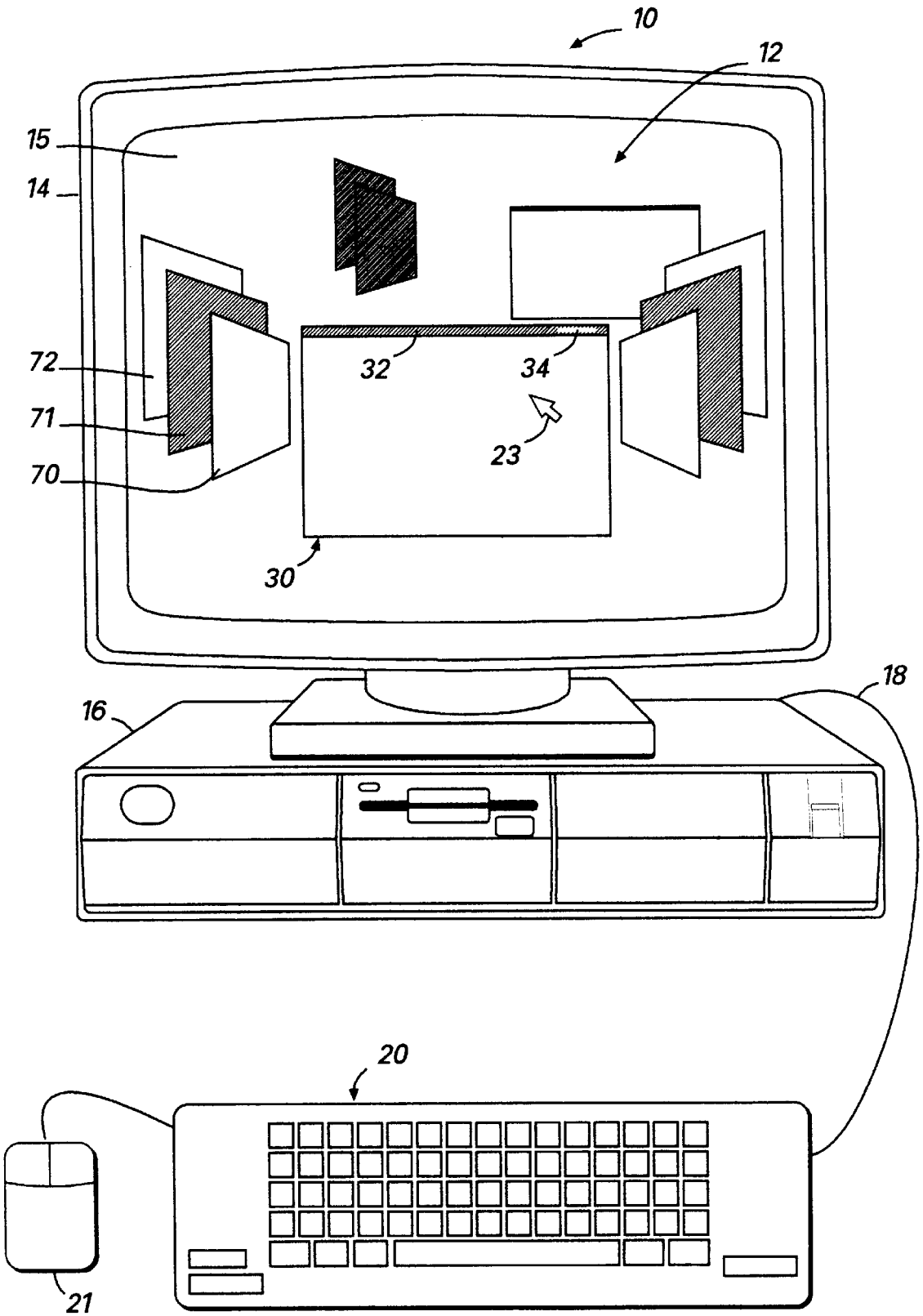
FIG. 1 is a diagram showing the basic components of a computer system used in connection with the preferred embodiment of the present invention.

Referring now to the drawings, in which like numerals illustrate like elements throughout the several views, FIG. 1 illustrates the basic components of a computer system 10 used in connection with the preferred embodiment of the present invention. FIG. 1 illustrates a graphical user interface 12 on a computer display screen 15 of a display monitor 14 of the computer system 10. The graphical user interface of the display system is preferably implemented as part of the operating system to provide a three-dimensional environment for displaying and managing the window objects of the operating system. The present invention enables cutting and pasting, moving objects, and other functions as generally performed by an operating system while providing visual depth cues displayed by the operating system consistent with the orientation and position of the object within predefined boundaries defining a space for providing the depth cues. Additionally, sounds such as beeps and warning signals, generally associated with the interaction of a user with a computer system, may appear, using stereo sound, to emanate from the window upon which a user is operating in the three-dimensional space. By varying the level of the sound and/or direction from which the sounds emanates, the sound may appear to emanate from a selected window. Although the present invention is described in conjunction with a conventional desktop computer, it will be appreciated that the present invention may be utilized in other types of computer systems that use a window based display system. The graphical user interface system 12 is implemented with a computer 16 connected to the display monitor 14. The computer 16 receives input data from a conventional keyboard 20 via an input line 18. Cursor keys on the keyboard 20, a mouse 21, trackball, or other pointing device may be used to move a cursor 23 on the display screen 15 for selection of various options. It should be appreciated by those skilled in the art that text entry or command input also may be accomplished by using a touch-sensitive pad or handwriting recognition device in conjunction with software for recognizing the corresponding input signals as selection signals.

Figure 2:
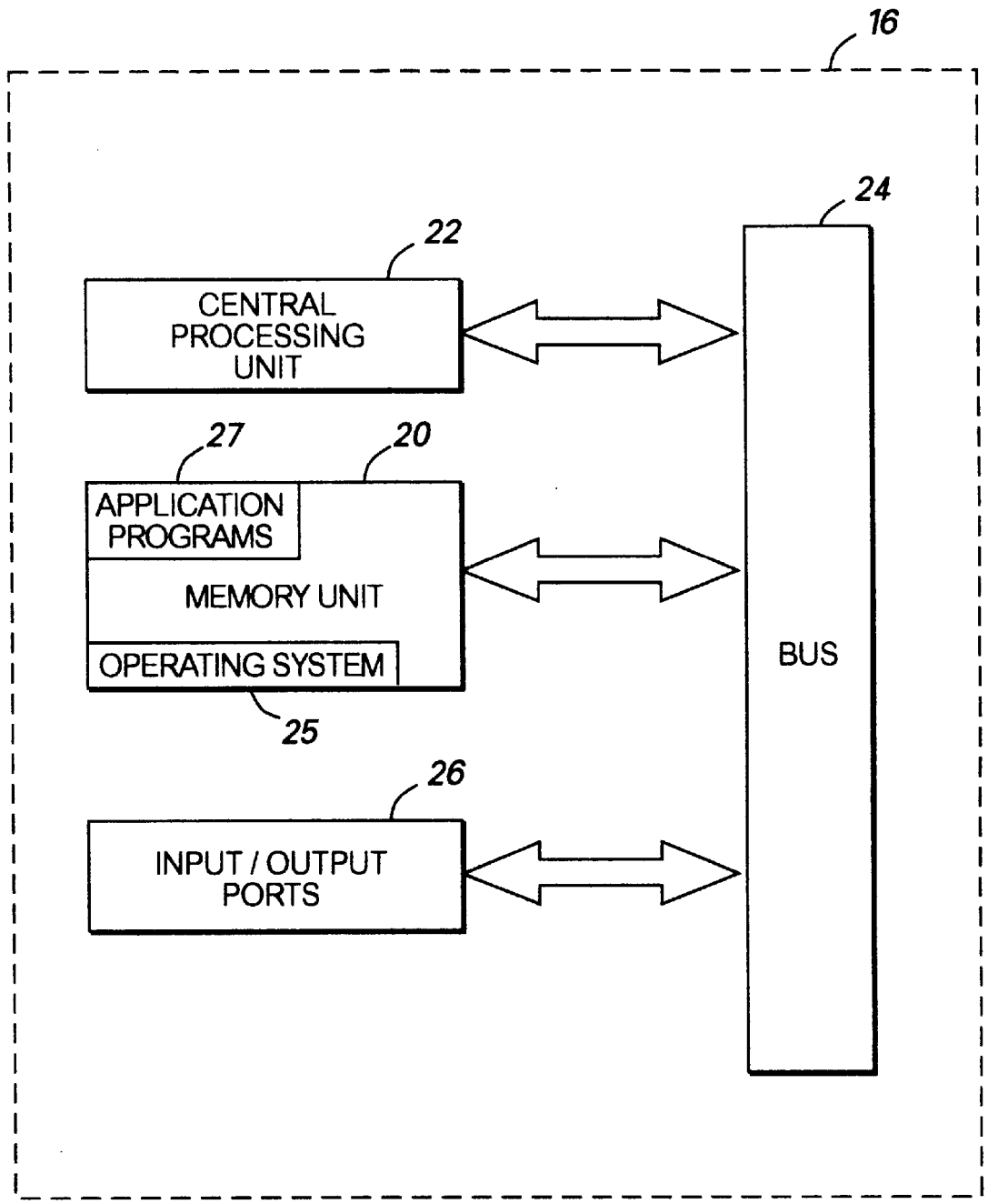
FIG. 2 is a block diagram showing the basic components of the computer system used in connection with the preferred embodiment of the present invention.

Referring to FIG. 2, the hardware components of the computer 16 are illustrated. For simplicity of the drawings, many components of a standard computer system have not been illustrated such as address buffers, memory buffers and other standard control circuits because these elements are well known and illustrated in the prior art and are not necessary for the understanding of the present invention. A computer program used to implement the various steps of the present invention is generally located in the memory unit 20, and the processes of the present invention are carried out through the use of a central processing unit (CPU) 22. Those skilled in the art will appreciate that the memory unit 20 is representative of both read-only memory and random access memory. The CPU 22 is typically implemented as a single-chip microprocessor, such as the models 80386 or 80486 that are available from Intel Corporation, Santa Clara, Calif. The CPU 22, in combination with computer software, such as an operating system 25 and application programs 27, controls the operations of the computer system 10. The operating system software 25, in conjunction with application programs 27, controls the allocation and usage of hardware and software resources such as memory, CPU time, disk space, and peripheral devices. It should be appreciated that many window based operating systems exist such as Microsoft "WINDOWS", a UNIX (e.g. X-windows) operating system, or a Macintosh operating system. The display routines are encoded in a graphical user interface display layer in the operating system. The system bus 24 supports communications of control, address, and data signals between the CPU 22 and the remaining components of the computer system 10. The memory unit 20 and the CPU 22 are connected by a computer system bus 24 designed to provide an electrical interface between computer system components. The processes implemented by the CPU 22 may be communicated as electrical signals along the computer system bus 24 to an input/output device 26, such as display monitor 14. The display monitor 14 provides a visual display of computer generated graphics originating from the processes implemented by the CPU 22.

In this detailed description, numerous details are provided such as computer display system elements, object definitions, display formats, sample data, etc., in order to provide an understanding of the invention. However, those skilled in the art will understand that the present invention may be practiced without the specific details. Well-known circuits, programming methodologies, and structures are utilized in the present invention but are not described in detail in order not to obscure the present invention.

Certain of the descriptions which follow are presented in terms of display images, processes, and symbolic representations of operations of data bits within the computer's memory. As will be known to those skilled in the programming arts, these process descriptions, class descriptions, messages, notification descriptions, and graphic displays are the means used by those skilled in the art of computer programming and computer construction to convey teachings and discoveries to others skilled in the art.

For purposes of this discussion, a process or method is generally a sequence of computer-executed steps leading to a desired result. These steps require physical manipulations of physical quantities. Usually, though not necessarily, these quantities take the form of electrical, magnetic, or optical signals that are capable of being stored, transferred, combined, compared, or otherwise manipulated. It is conventional for those skilled in the art to refer to these signals as bits, data, values, elements, symbols, characters, images, terms, numbers, or the like. It should be kept in mind, however, that these and similar terms should be associated with appropriate physical quantities inside the computer and that these are merely convenient labels applied to these physical quantities that exist within the computer.

It should also be understood that manipulations within the computer are often referred to in terms such as adding, comparing, moving, etc., which are often associated with mental operations performed by a human operator. It must be understood that involvement of a human operator is not necessary in the present invention because the operations described herein are machine operations performed in conjunction with a human operator or user that interacts with the computer. The machines used for performing the operation of the present invention include general purpose digital computers or other similar computing devices.

The present invention relates to methods, steps, or operations for a computer which processes electrical or other physical signals to generate desired physical signals and display results and interactions. As illustrated in FIG. 1, the present invention also relates to apparatus 10 for performing these operations. This apparatus 10 may be especially constructed for the described purposes.

Furthermore, it should be understood that the programs, processes, objects, etc., described herein are not related or limited to any particular computer or apparatus. Rather, various types of general purpose machines may be used with programs constructed in accordance with the teachings herein. Similarly, it may prove advantageous to construct specialized apparatus to perform the method steps described herein by way of dedicated computer systems with hard-wired logic or programs stored in nonvolatile memory such as read only memory.

Referring again to FIG. 1, the programming techniques and manner of handling windows in a computer system will be discussed. Those skilled in the art will understand and appreciate that operating systems for displaying and utilizing windows may be implemented by using object-oriented programming languages and techniques. Object-oriented programming techniques are utilized by those skilled in the art of computer programming because they provide a powerful way to view the interaction of a user with a computer system. For example, one particular "object" that people often work with on computer screens is called a window. Referring to FIG. 1, a window 30, as discussed above, is a rectangular area on the display screen 15 that is used to display information or receive commands or data from the user. The display screen 15 itself may be considered a window into the computer 16. The window 30 receives user input from a keyboard 20, mouse 21, or pen, and displays graphical output upon which a user may interact. The display screen 15 thereby serves as the workspace for the computer. A computer program is responsible for generating the window 30 and for responding to user interactions with the window 30. The window 30 often contains the computer program's title bar 32 across the top of the window 30, menus, sizing borders, and perhaps other objects.

The window 30 may contain additional, smaller windows called "child windows", which are subspecies or subclasses of windows. Child windows may take the form of push buttons, radio buttons, check boxes, text entry fields, list boxes, and scroll bars, and the like. These objects when displayed on the computer screen may be pressed or clicked or scrolled. A user sees a window as an object on the screen, and interacts directly with the object by pushing buttons 34, or scrolling a scroll bar, or tapping a handle displayed in the window 30. Buttons 34 may control a function for the particular window.

A window generated by a computer program receives user input in the form of messages to the window. The messages are generated by an event handling routine that is responsive to user input such as tapping, clicking, or dragging a cursor with a stylus or mouse.

The following is a brief example of an object-oriented programming methodology for resizing a window utilized in the Microsoft "WINDOWS" graphical user interface operating system. Consider a word processor application computer program that displays text in a window. The window may include a "size box", which is a control located at the lower right-hand corner of the window. If selected and dragged, the size box causes the size of the window on the display screen to become larger or smaller. If the program's window is resized, the word processing program application program will reformat and move the text on the display screen to fit within the window when the window is resized.

The computer's operating system program generally handles the details of resizing the window, and the application program running under control of the operating system program responds to the system function of resizing the window. The word processing program "knows" when its window is resized because a message is passed to it indicating a resizing operation, and the application program responds by repositioning the text within the available window. In the "WINDOWS" operating system, when a user resizes a window, the operating system sends a message to the application program indicating the new window size. The program then adjusts the contents of its window to reflect the new size.

The passing of a message to a program is tantamount to making a call to a function within the program. Such a function call can be made to the operating system or to an application program. Those skilled in the art will understand that such mechanisms are how a program opens a disk file, for example, or scrolls text from an area that is "off screen" into view within the window. An operating system may make calls to a program by passing it messages, in a similar manner that the application program makes a call to the operating system.

Every window object that a program creates has an associated window procedure (also called a "method"). This window procedure or method is a function that could be either in the program itself or in a linked library of appropriate routines that can be executed upon a call. The "WINDOWS" operating system sends a message to a window by calling a window procedure. The window procedure does processing based on the message passed to it and then returns control to the operating system, possibly with a "notification" or other response. (A "notification" is merely a message passed back to a calling program, and usually indicates status information or the results of an operation.)

A window displayed on a display screen is based on what is known as a "window class" of objects. The window class of objects identifies a particular procedure that processes messages passed to that window. The use of a window class allows multiple windows to be based on the same window class, and thus use the same window procedure. For example, control buttons in programs that utilize the "WINDOWS" operating system are based on the same window class. A window class is associated with a window procedure that processes messages to all button windows.

In object-oriented programming, an "object" is a combination of computer program code and data. A window is a type of object. The computer program code carries out tasks associated with the object. The data is the information retained by the window procedure and information retained by the "WINDOWS" operating system, for each window or window class that exists.

A window procedure processes messages to the window. Often these messages inform a window of a user input from a keyboard, mouse, or pen. This is how a child window that is a button "knows" that it is being "pressed," or an icon "knows" that it is being dragged. Other messages tell a window when it is being resized or when the surface of a window needs to be repainted on the monitor.

When a program begins execution in such an operating system as the "WINDOWS" operating system, the operating system creates a "message queue" for the program. This message queue stores messages to all the various windows a program may create. The program includes a portion of program code called the "message loop" to retrieve the messages from the queue and dispatch them to the appropriate window procedure. Other messages may be sent directly to a window procedure without being placed in the message queue.

Three-Dimensional Window Operation and Control

Figure 3:
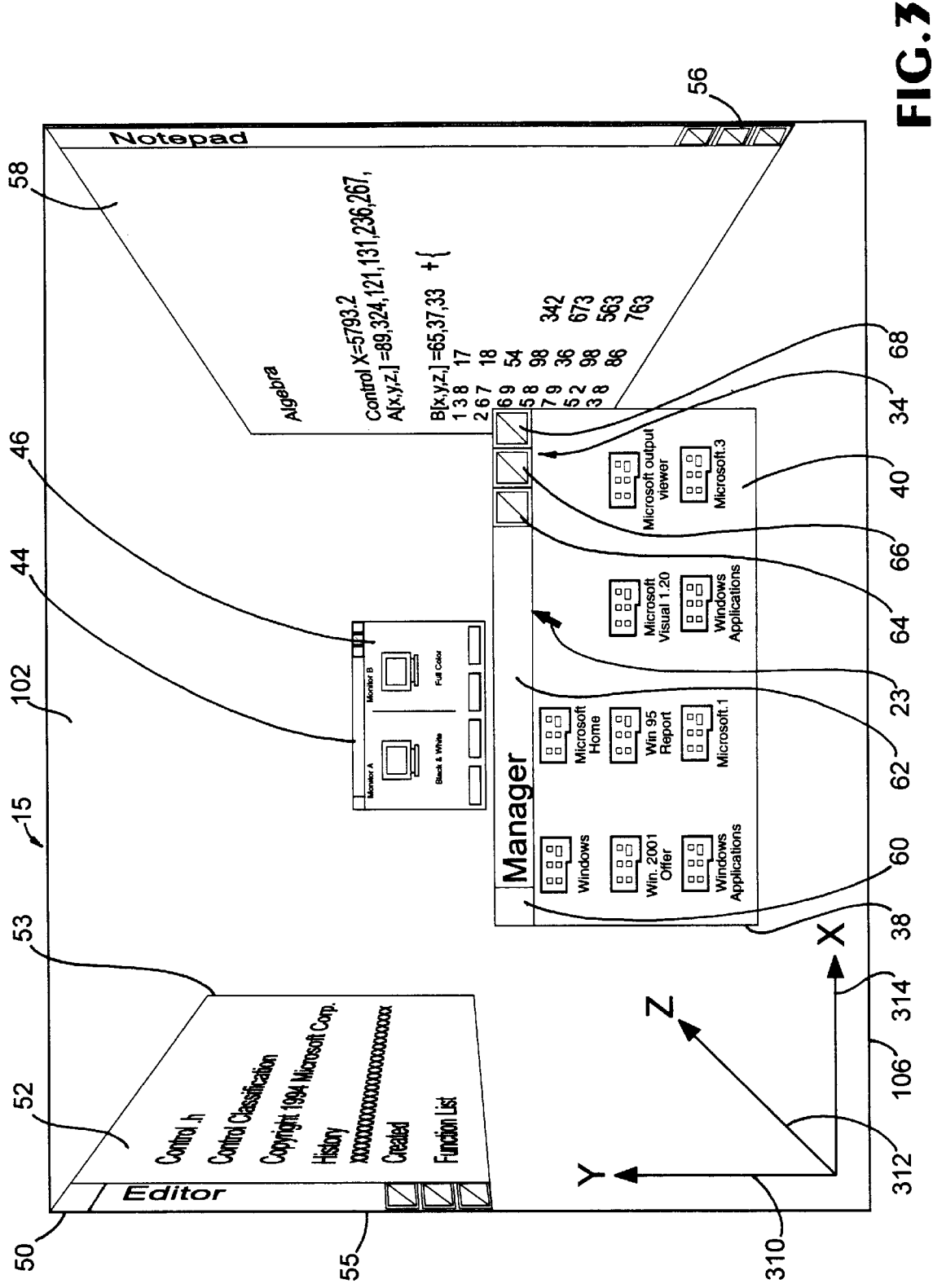
FIG. 3 illustrates a detailed view of the display screen generated in accordance with the present invention.

Referring to FIG. 3, a more detailed view of the graphical user interface 12 of the display screen 15 of the present invention is shown. The graphical user interface 12 provides depth cues in a manner to yield a three-dimensional view of the windows and/or objects displayed on the display screen 15. A window is considered to be transformed when three-dimensional depth cues are provided to the window. Thus, a simulated three-dimensional display of the windows is provided. By providing three-dimensional graphics to the windows/objects created and managed by an operating system, the computer workspace is effectively enlarged for a standard graphical user interface consisting of windows, icons, menus, and pointer (WIMP). The display screen may be considered to have an x, y, z coordinate system with an x-axis 310, a y-axis 312, and a z-axis 314. The three-dimensional virtual workspace displays the windows and objects of the operating system so that the windows and objects appear to project along the z-axis 314 into the display screen 15. Each displayed window has its own set of buttons and controls as in conventional window environments including transformed windows.

The display or positioning of the windows on the display screen 15 is within predefined boundaries that may be considered a space or open room. The open room can be viewed from the outside, with the room having front, back, top, bottom, left, and right walls. As used herein, "walls" of a three-dimension room space may be referred to as planes. The front plane 38 shown containing the window 40 provides a view which is similar to a window as typically presented in conventional windowing environments in two dimensions. In conventional windowing environments, the windows and data are shown on a single front or forward two dimensional plane. However, unlike conventional window systems, a back plane 44 and other planes may be utilized to display a window 46 as illustrated.

The back plane 44 displays a window that is generally the same shape (rectangular) as a window on the front plane 38 except that the window 46 displayed on the back plane 44 is zoomed back or set at a distance (along the z-axis 314) from the front plane 38. Thus, the windows appearing or "hanging" on the back plane 44 have smaller dimensions and thus appear farther away than the windows appearing on the front plane 38. In addition to the window 46 appearing smaller than the window 40 on the front plane 38, the text within the window 46 on the back plane is also reduced in scale to further give the appearance of distance along the z-axis 314.

As noted above, the left and right planes 50 and 56 are analogous to the sides or the walls of a room or box. As illustrated, a window 58 may be positioned on or "hung" on the right plane 56. Similarly, a window 52 may be hung on the left plane 50. Windows hung on either the left plane 50 or the right plane 56 are considered to be in "perspective." When a window is in perspective, the edge 53 of the window that is farthest away from the user's view, as looking along the z-axis 314 into the display screen 15, is smaller than the edge 55 that appears closer to the user. Although not illustrated with windows displayed thereon in FIG. 3, bottom or floor planes 106, and top or ceiling planes 102 may be used for hanging windows at the bottom or top of the screen, respectively. Windows appearing at the top or bottom of the display screen 15 would likewise be displayed in perspective at the bottom or top of the screen, similar to the windows 52 and 58 displayed on the left plane 50 and the right plane 56, respectively.

When an application program is initially opened, a window is created and attached to the front plane 38. The window will remain on the front plane 38 until the user positions the window on another plane by use of a transfer or transformation control, such as the perspective-transform left button 66, perspective-transform right button 68, or pushback button 64. The current plane will become part of the profile information for the application so subsequent invocations of the program will result in a window being created and attached to the plane that the window was attached to when the application was last shut down. For example, if the main window of an application is attached to the left plane 56, when the user closes the application using the exit command on the file menu of the application, the next time the user runs the application, the application's main window will appear on the left plane 56 because that is where the main window was when the application was terminated.

When a user resizes a window or perspective-transforms a window in accordance with the present invention, the computer application handles the resizing operation as the program would in a conventional window environment. However, the operating system provides the appropriate scaling for the shape, size, and contents of the window to fit on the appropriate plane. Thus, no specialized programming is required for computer applications designed to operate in conventional window-based operating systems.

In conventional window display systems, the operating system specifies a destination rectangle which specifies the location in the frame buffer for displaying the window containing the computer application data. The destination rectangle is generally specified in pixel coordinates. The operating system utilized in connection with the present invention receives data that is created to be stored in a destination rectangle in a frame buffer then scales the data to dimensions that provide a destination area yielding a three-dimensional depth or perspective appearance on the display screen. This destination area is given in pixel coordinates.

When the operating system and CPU detect that one of the control buttons has been selected, the operating system notifies the appropriate window object, and it then uses a series of notifications (a) to release itself from the plane that it is currently attached to and (b) to attach itself to a different plane based on the control that was selected. Transformation matrices, as known to those skilled in the art, are applied during rendering of the image. The transformation matrices are applied to the drawing commands that an object sends to the graphics engine of the computer system. The matrices are standard 4×4 transformation matrices known to those skilled in the art.

With continuing reference to FIG. 3, the control buttons 34 for controlling the positions of the display windows on the various planes of the display system are shown. A system menu button 60, a title bar 62, a push back button 64, a perspective-transform left button 66, and a perspective-transform right button 68 are shown along the top of window 40. The same control buttons are displayed in the same position on the window 46 appearing on the back plane 44 and in a left-to-right arrangement as illustrated on the window 40. When a window is attached or hung on the left plane 50 or right plane 56, the controls 34 are arranged top to bottom as illustrated on windows 58 and 52. Also, the title bar 62 is realigned so that when the title bar 62 is attached to either the right plane 56 or the left plane 50, the text runs from top to bottom. The function of the controls of the display system are as follows.

The system menu accessed by the system menu button may provide a menu access to the functionality provided by the pushback button 64, perspective-transform left button 66, and perspective-transform right button 68 as well as access to functions that move and resize a window. The functionality of moving and resizing is the same as the system menu in the current Microsoft Windows GUI. The title bar 62 contains the textual representation of the name of the "owning" window. The term "owning" generally means the object containing a specified item or the object to which the item pertains. The name appearing in the title bar 62 can be changed by the operating system program by means of a message to the owning window when a user makes the appropriate change. The text is re-oriented, such as left-to-right or top-to-bottom, based upon the plane on which the window is displayed.

By selecting the push back button 64 of a particular window, the window is displayed or moved to either the front plane 38 or back plane 44 depending upon which of the planes the window is currently located. If the push back button 64 is selected and the window was on front plane 38, then the window is zoomed backward and attached to the back plane 44. If the window is currently located on the back plane 44 when the push back button 64 is selected, then the window is zoomed forward and attached to the front plane 38. Similarly, if the push back button 64 is selected on a window 58 that is located on a side plane, the window is pushed back to either the front plane 38 or the back plane 44 depending on whether the window was previously attached to the front plane 38 or the back plane 44. When the push back button 64 is selected and if the window 58 was previously attached to the front plane 38, then the window 58 is pushed back to the back plane 44 and vice versa. When the push back button is selected and if the window 52 was previously attached to the back plane 44, then the window 52 is pushed back to the front plane 38 and vice versa.

When the perspective-transform left button 66 is selected for a particular window, the window is placed on the left plane. If the window is currently attached to either the front plane 38 or the back plane 44, then the operating system causes the window to be removed from the current plane and displayed on the left plane. When a window is selected to be transferred to the left plane 50, the current plane containing the window is saved as the last saved plane for that selected window to be referenced when the perspective-transform controls are subsequently selected for the window. If the window is currently attached to the left plane 50 when the perspective-transform left button is selected, the operating system 25 removes the current window from the left plane and attaches the current window to the last saved plane. For example, when a window is attached to the front plane and the perspective-transform left button is selected, the window is attached to the left plane, and the front plane position is saved as the last saved plane. Selecting either the perspective-transform left or perspective-transform right button on this window will result in the window being detached from the left plane and returned to the front plane. If the window had been attached to the back plane prior to the perspective-transform left button being selected, the window would be returned to the back plane. The system does not save the left plane position when a window is removed from the left plane because the perspective-transform left button positions the window on the left plane.

When the perspective-transform right button 68 is selected for a particular window, the window will be placed on the right plane. If the window is currently attached to either the front plane 38 or the back plane 44, then the operating system causes the window to be removed from the current plane and displayed on the right plane. When a window is selected to be transferred to the right plane 56, the current plane containing the window is saved as the last saved plane for that selected window to be referenced when the perspective-transform controls are subsequently selected for the owning window. If the window is currently attached to the right plane 56 when the perspective-transform right button 68 is selected, the operating system 25 removes the current window from the right plane and attaches the current window to the last saved plane. For example, when a window is attached to the front plane 38 and the perspective-transform right button 68 is selected, the window is attached to the right plane, and the front plane position is saved as the last saved plane. Selecting either the perspective-transform left or perspective-transform right button on this window will result in the window being detached from the right plane 56 and returned to the front plane 38. If the window had been attached to the back plane prior to the perspective-transform right button 68 being selected, the window would be returned to the back plane. The system does not save the right plane position when a window is removed from the right plane because the perspective-transform right button positions the window on the right plane.

Basic controls 60, 64, 66, and 68 utilized with the present invention are invoked with a mouse selection device in the same manner as the controls are selected in a conventional window environment. Also, the windows operating within a system of the present invention may be "dragged" to new positions as in conventional window applications. By clicking and holding the primary mouse button while the cursor 23 is in the title bar of a window, the window can be dragged to a new location. The window may be dragged to a new location when it is on any of the planes. The window movement and size may be limited to the extents of the defined planes.

Referring again to FIG. 1, windows may be stacked behind one another as illustrated with windows 70 and 72. Window 72 appears behind window 70. Because these windows are stacked, an order for these windows is established. The ordering of the windows is termed the "z" position. A list, termed the z-order list, indicates the order or spacing of windows as the windows appear on a plane of the display screen. A basic stacking procedure places a window into the first available slot in the z-order list. When placing a window in the first available slot, a newly perspective-transformed window may disappear behind windows that are already attached to the plane rather than appearing in front of the windows that are currently displayed on the plane. For example, when the intended destination of a selected window is to a boundary plane already containing a transformed window, the selected window is placed on the adjacent plane to the boundary plane that is closest to the boundary plane, such as plane 71 containing window 72. Adjacent planes refer to planes that are parallel (in the three-dimensional space) to the boundary plane but that are positioned at selected increments away from the boundary plane along the normal vector from the plane towards the center of the virtual space. Windows selected for display on a designated plane are displayed respectively to the closest available adjacent plane. This provides an ordering from the center of the three-dimensional space to the boundary plane for all transformed windows on the boundary plane. When placing multiple windows on the left and right planes, the windows are preferably cascaded slightly down the wall and slightly toward the user. The contents of displayed windows may be generally viewed in full when the windows are hung on different planes. Also, the windows may have focus or be operated on when displayed or hung on a plane.

Each plane in the system allocates an array to contain pointers to windows. This array is initialized so that all of the storage locations are set to zero. When a new window is attached to a plane the array of window pointers is searched and advancing until the first slot in the array that is zero is found. Once an empty position is found in the array, the new window pointer is stored at the location. When a window is detached from a plane, the location in the array that contained the pointer to the window is set to zero. When a plane is notified that it needs to paint, it iterates through its window pointer array starting at zero. The plane has a member variable that is the number of windows that are currently attached to the plane. The painting loop terminates when it either: (a) reaches the end of the array; or (b) determines that it has painted all of the windows that are currently attached to the plane by incrementing a local variable every time that it finds a window in the array and comparing this local variable to the member variable that is the count of the windows currently attached to the plane. It is to be appreciated by those skilled in the art that the specific z-position of a perspective-transformed window may include various ordering schemes known by those skilled in the art.

Figure 4A:
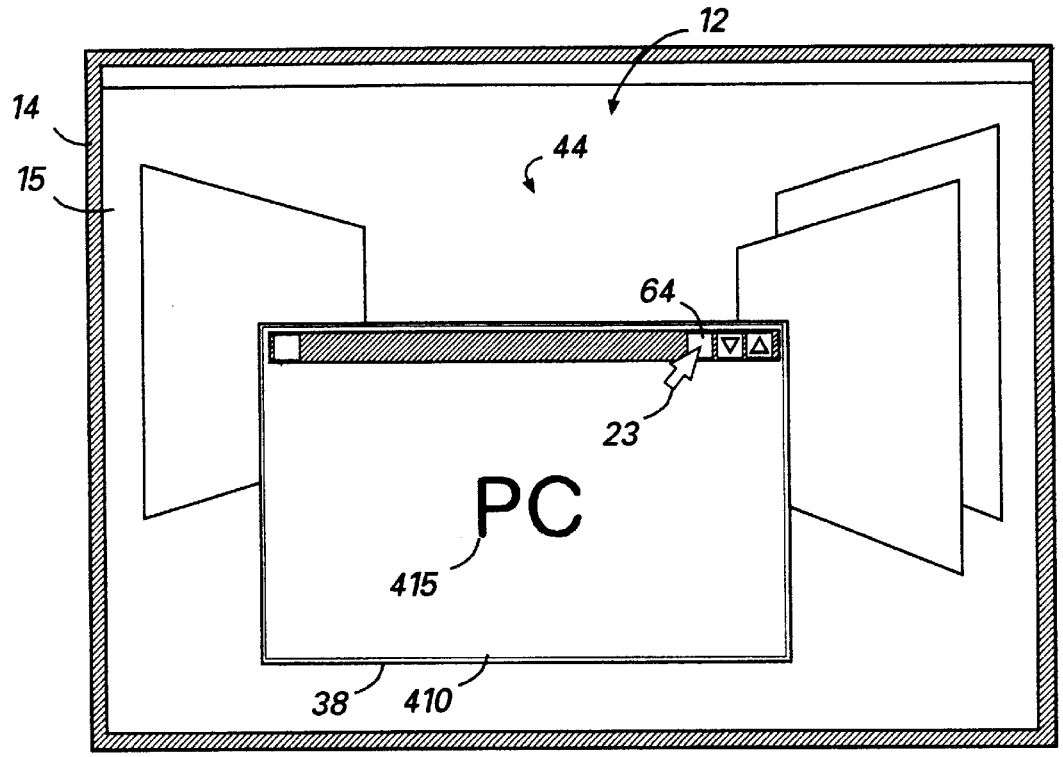
FIGS. 4a, 4b, and 4c illustrate a manipulation of displayed windows in accordance with the present invention.
Figure 4B:
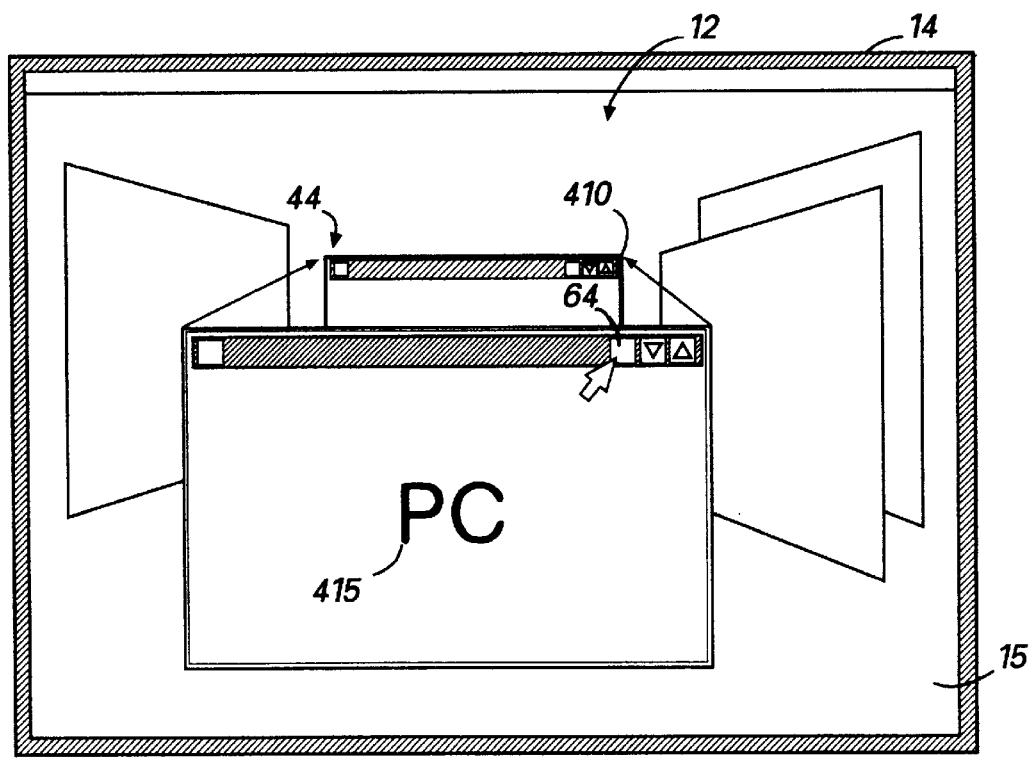
Figure 4C:
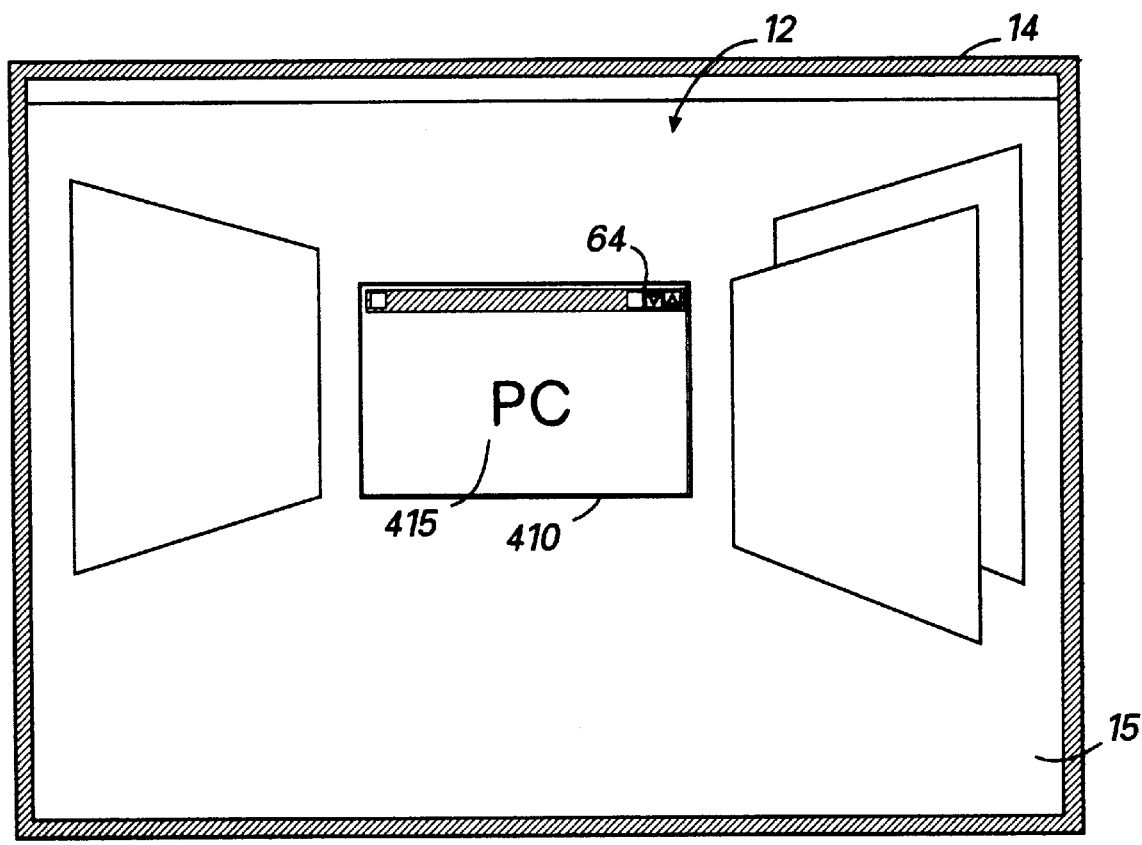

Referring to FIGS. 4A, 4B, and 4C, the operation of the push back button 64 as applied to a window is illustrated. Referring to FIG. 4A, a window 410 is shown displayed on the front plane 38. When the push back button 64 is selected within the window 410 by the cursor 23 as shown, the window 410 and its data content 415 is transformed or moved to the back plane 44 as illustrated in FIG. 4B. After the push back selection was initiated in FIG. 4A, the final position of the window 410 is shown in FIG. 4C. The window 410 shown in FIG. 4C has been fully zoomed backward (set at a distance along the z-axis) to the background where the window 410 and its contents 415 have been rescaled to appear at distance from the front plane 38.

Figure 5A:
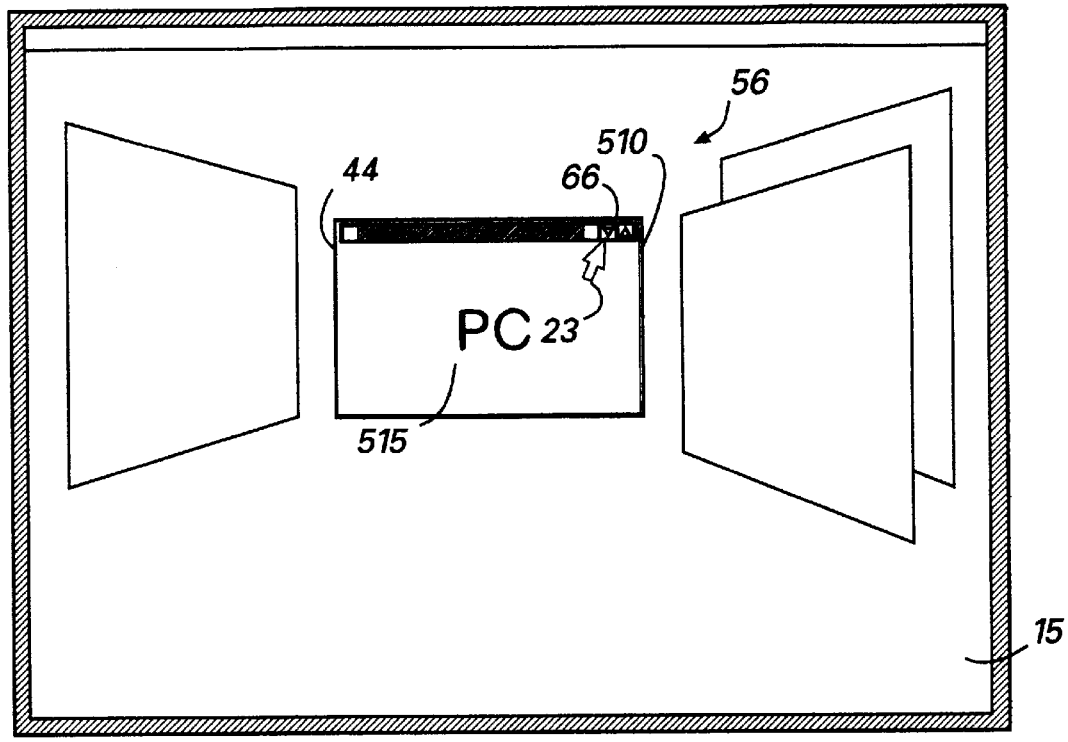
FIGS. 5a, 5b, and 5c illustrate another manipulation of displayed windows in accordance with the present invention.
Figure 5B:
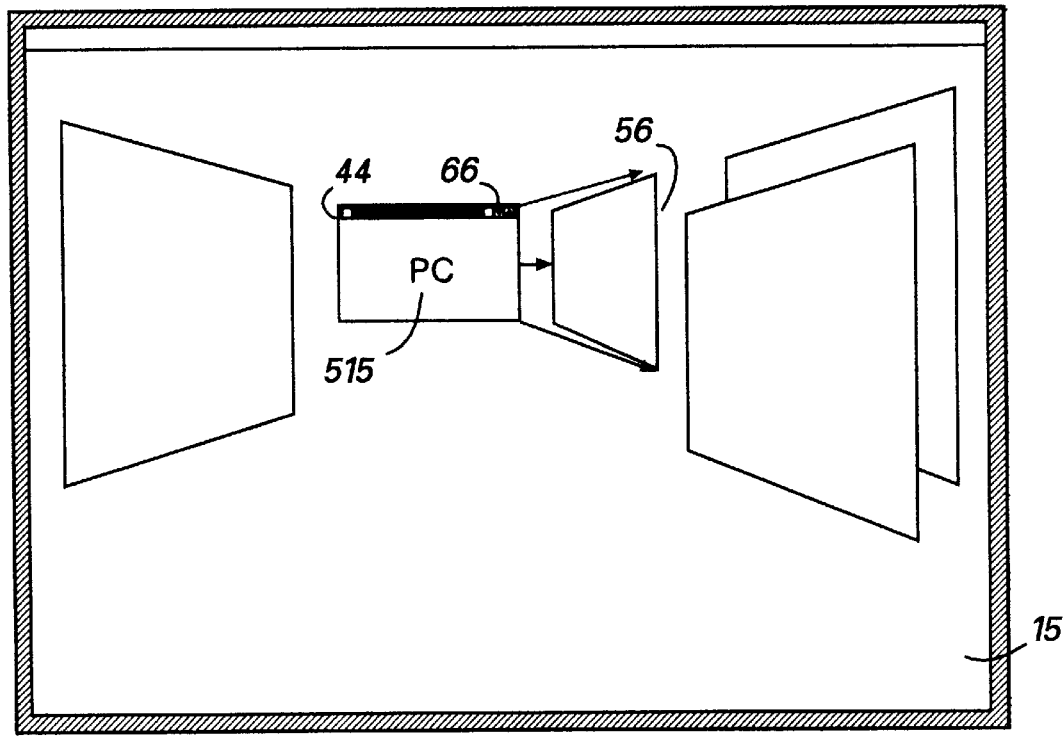
Figure 5C:
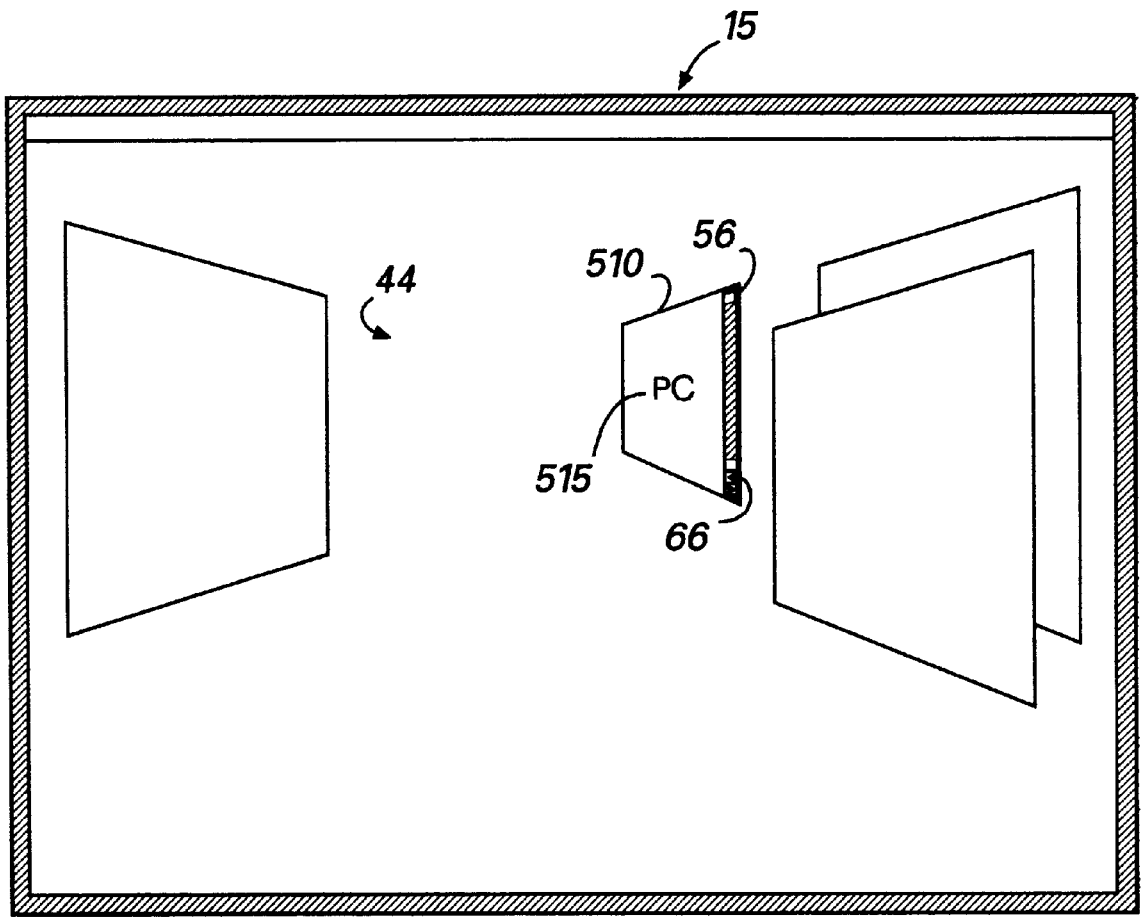

Referring to FIGS. 5A, 5B, and 5C, the operation of the perspective-transform right button 68 is illustrated. FIG. 5A shows a window 510 displayed on the back plane 44. When the perspective-transform right button 68 is selected within the window 510 by the cursor 23 as directed by the user, the window 510 is transformed or moved to the right plane 56 as illustrated in FIG. 5B. After the perspective-transform right selection was initiated in FIG. 5A, the final position of the window 510 is shown in FIG. 5C. The window 510 and its data content 515 shown in FIG. 5C has been fully transformed to the right plane 56 and given a shape that creates the appearance of a perspective rendering, with the left side of the window 510 narrowing as it approaches a selected point or the center point of the display screen 15 as the distance along the z-axis increases away from the user.

Figure 6A:
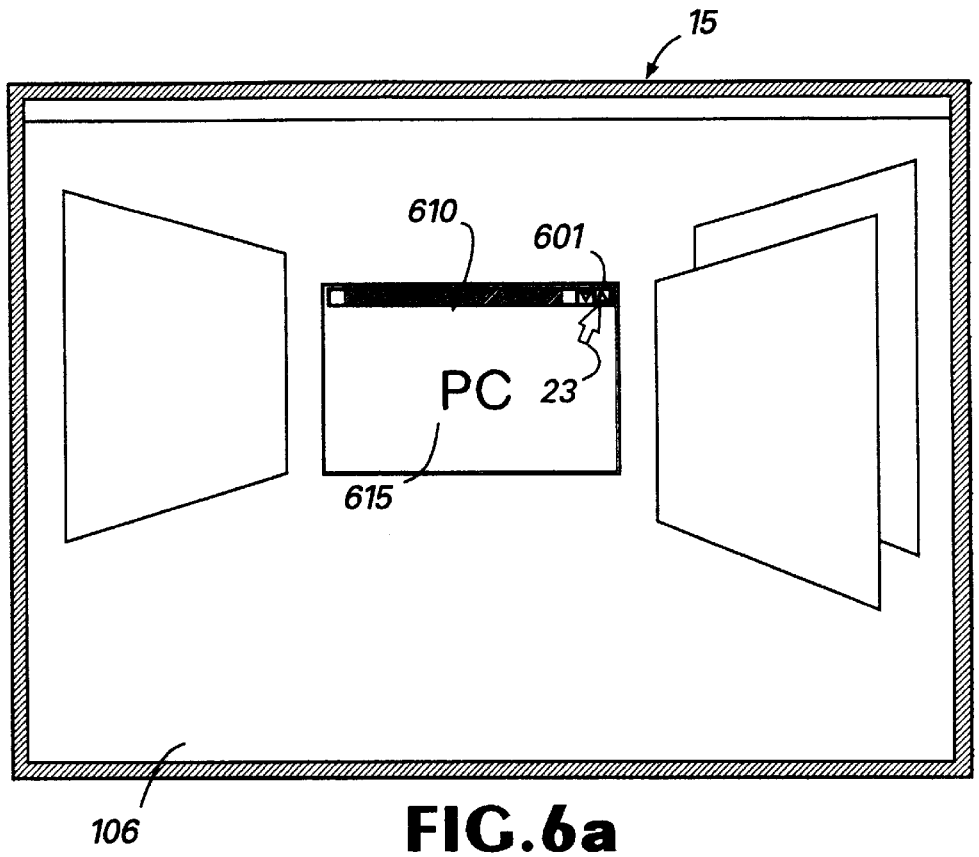
FIGS. 6a, 6b, and 6c illustrate another manipulation of displayed windows in accordance with the present invention.
Figure 6B:
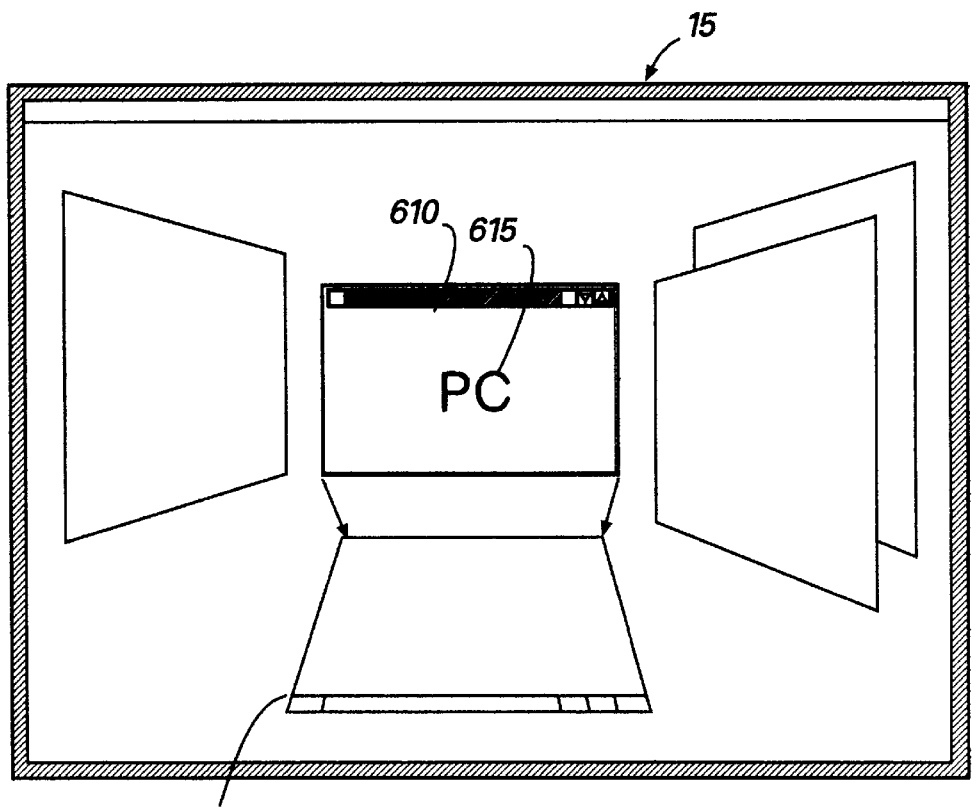
Figure 6C:
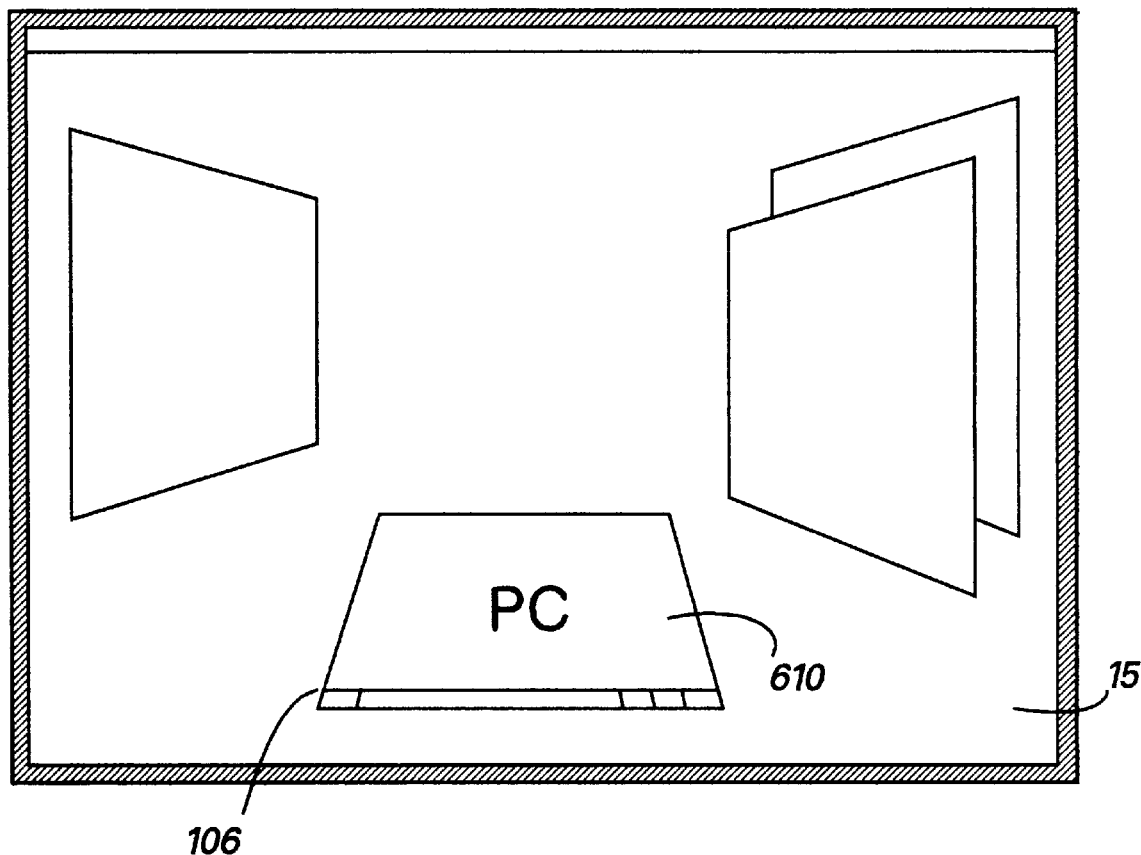

Referring to FIGS. 6A, 6B, and 6C, the operation of a perspective-transform below button 601 is illustrated. FIG. 6A shows a window 610 displayed on the plane 38. When the perspective-transform below button 601 is selected within the window 610 by the cursor 23 as directed by the user, the window 610 is transformed or moved to the bottom plane 106 as illustrated in FIG. 6B. After the perspective-transform below selection was initiated in FIG. 6A, the final position of the window 610 is shown in FIG. 6C. The window 610 and its data content 615 shown in FIG. 6C has been fully transformed to the bottom plane 106 and given a shape that creates the appearance of a perspective rendering with the far side of the window 610 narrowing as it approaches a selected or center point of the display screen 15 as the distance along the z-axis increases.

The push back button 64, the perspective-transform left button 66, the perspective-transform right button 68, and the perspective-transform below button 601 may be used to transform a nontransformed window into a perspective transformed window or converting a perspective transformed window into a nontransformed window by selecting any one of the individual controls. An alternative method that utilizes a one button control process for transforming the windows to the multiple views within the operating system. The one button control for determining the position of windows on the various walls or planes is discussed in connection with FIGS. 7A–10C. The one button control discussed in FIGS. 7A–10C utilizes a click-and-drag type functionality to designate a window to be transformed.

Referring to FIGS. 7A–10B, the operation of a single multiple control window transform button 710 is illustrated. A user may guide or place a cursor 23 on the window transform button 710 on the tool bar of the nontransformed window 722. A user may then press the selection mechanism of the cursor control, such as a control button on a mouse, and hold the mouse control button down and drag it in the direction of the plane on which the user wants the window displayed. As the window transform button 710 is dragged, an arrow is displayed in the direction of a drag motion indicated by the user. By displaying the direction arrow, the user is provided with feedback or given an indication of the computer's interpretation of the user's selection. If the user agrees with or accepts the plane selection indicated by the direction arrow generated that points in a direction of the plane on which the window will be displayed, the user may release the mouse control button when the plane selection arrow is displayed. The window will then be displayed on the plane indicated by the selection arrow. The window appears to "fling" to the plane or wall pointed to by the plane direction arrow. By clicking on the window transform button 710 in a window that has already been perspective transformed, the window is transformed back to a standard window and is displayed on the front plane.

Figure 7A:
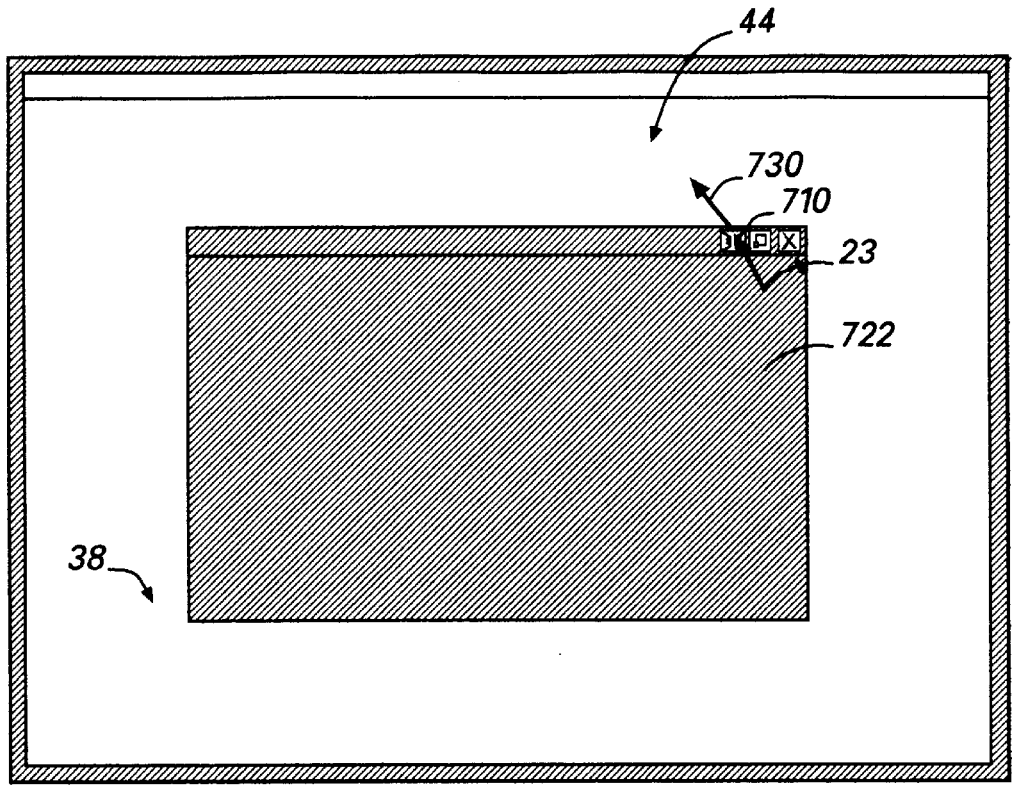
FIGS. 7a, 7b, 7c, and 7d illustrate an alternate embodiment of a control mechanism for manipulation of displayed windows in accordance with the present invention.
Figure 7B:
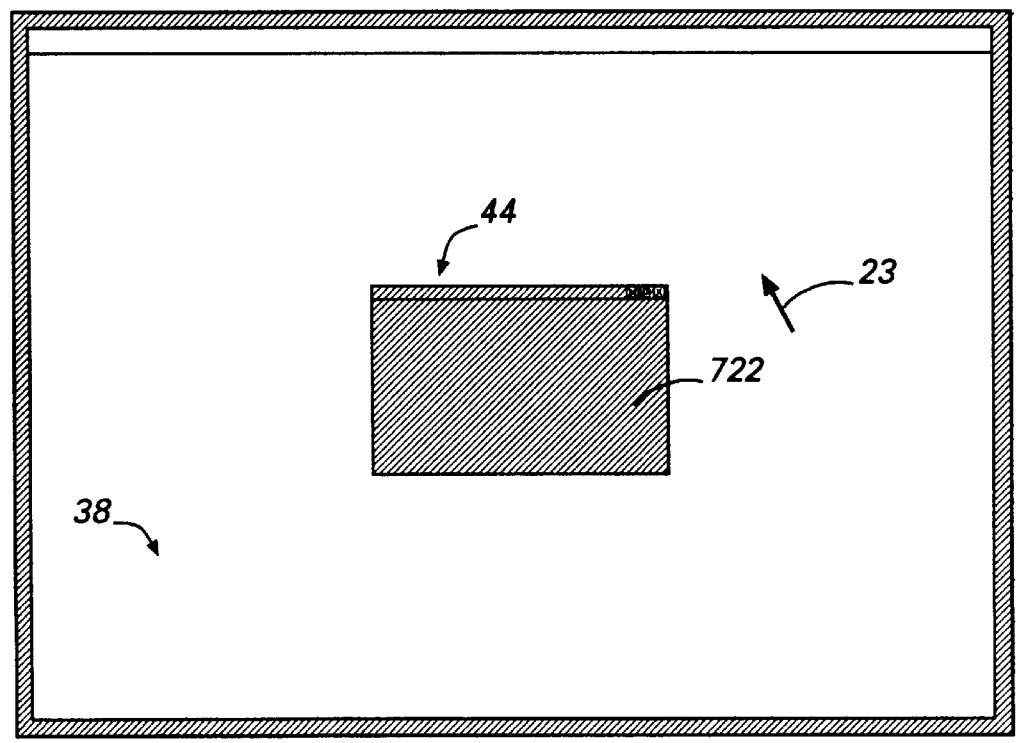

Referring to FIGS. 7A, 7B, 7C, and 7D, the operation of the single window transform button 710 is illustrated. The example of FIGS. 7A, 7B, 7C, and 7D shows the operation of the window transform button 710 when a pushback or zoom out operation is selected by a user. Referring to FIG. 7A, the cursor 23 is shown positioned on the window transform button 710. The user has selected the zoom out function of the window transform button 710. The user makes the selection by positioning the cursor 23 on the window transform button 710 and by clicking on the window transform button 710 and dragging the cursor 23 upwards in the direction of the back plane 44 as indicated by the plane direction arrow 730. The direction indicated by the plane direction arrow 730 points toward the zoom out or back plane 44 position. Thus, the user is provided with an indication of the computer's interpretation of the user's selection. If the user desires to have the window 722 zoomed back to the back plane 44, a user simply releases the selection mechanism of the cursor control while the direction arrow 730 is pointing in the direction of the zoom back position. Upon release of the selection mechanism of the cursor control, the window 722 is transformed or zoomed back to the back plane position as illustrated in FIG. 7B.

Figure 7C:
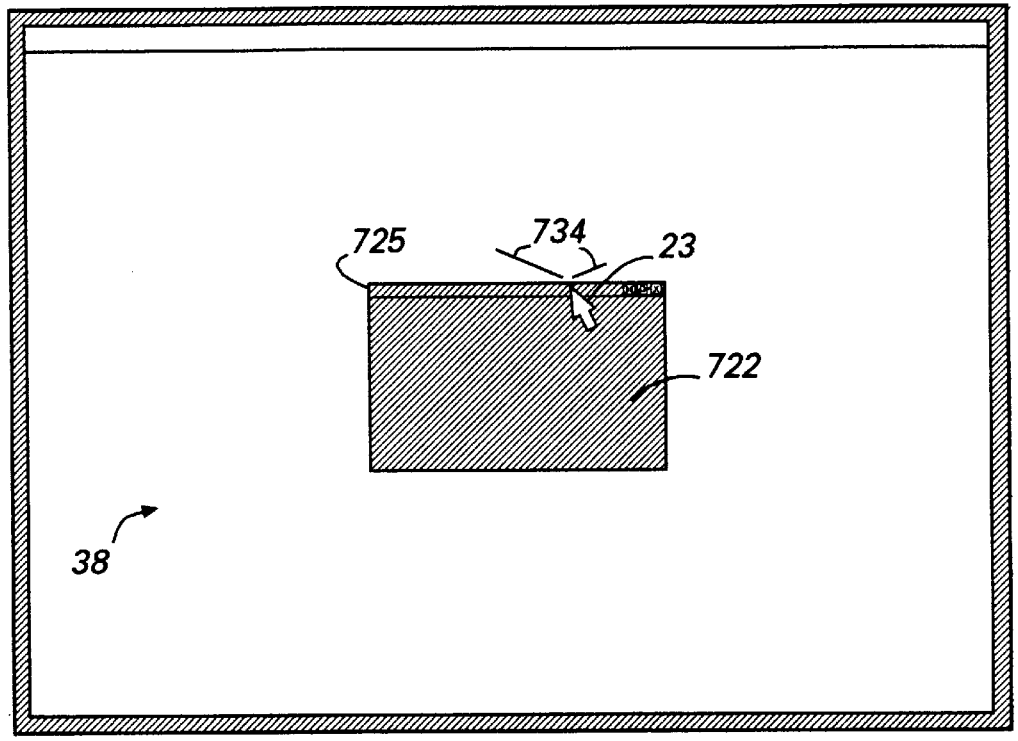
Figure 7D:
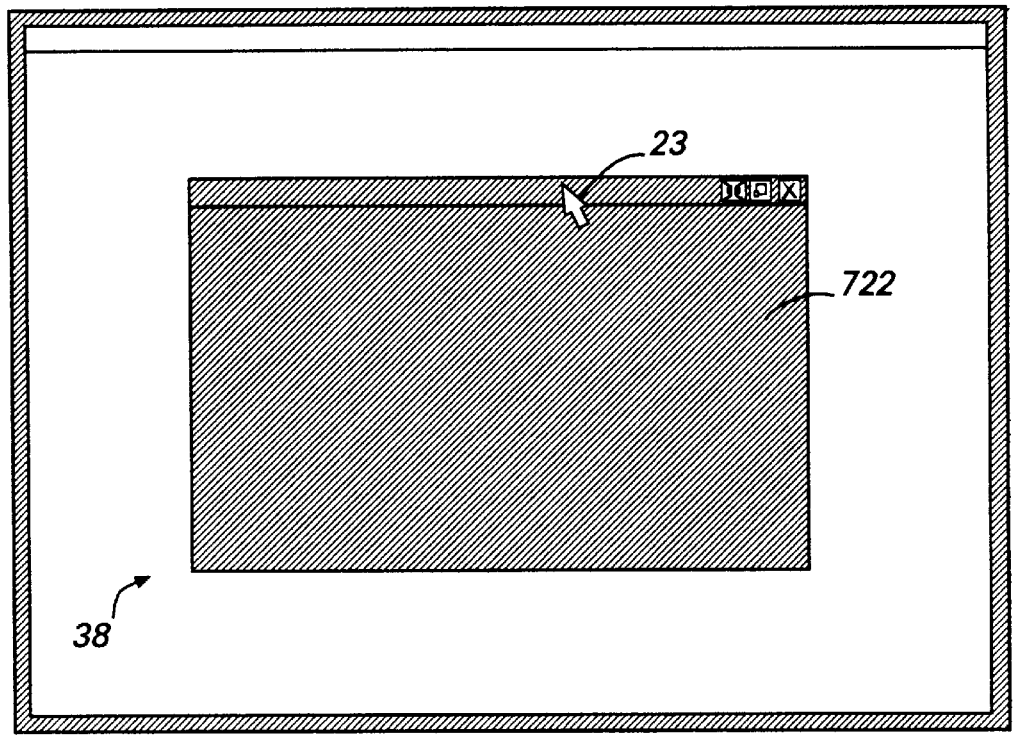

Similar to the method by which the window 722 is positioned on the back plane 44, the user may zoom forward or transform the zoomed back window 722 of FIG. 7C by positioning of the cursor 23 on the title bar 725 and then clicking and dragging the cursor 23 upwards to produce the two-angled direction lines 734. The direction lines 734 indicates that the computer interprets the user's selection as a desired transformation to the front plane 38. If the user accepts this interpretation by the computer, the user releases the selection mechanism of the cursor control which then causes the window 722 to zoom forward or fling to the front plane position as illustrated in FIG. 7D.

Figure 8A:
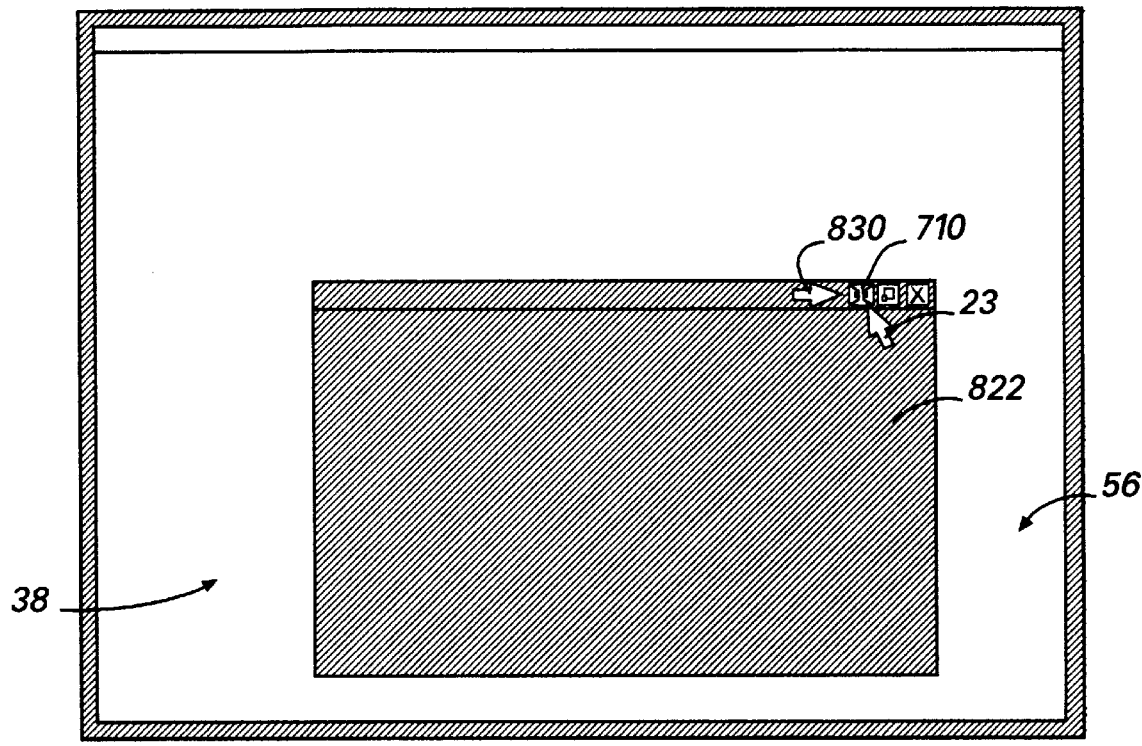
FIGS. 8a, 8b, 8c, and 8d illustrate an alternate embodiment of a control mechanism for manipulation of displayed windows in accordance with the present invention.
Figure 8B:
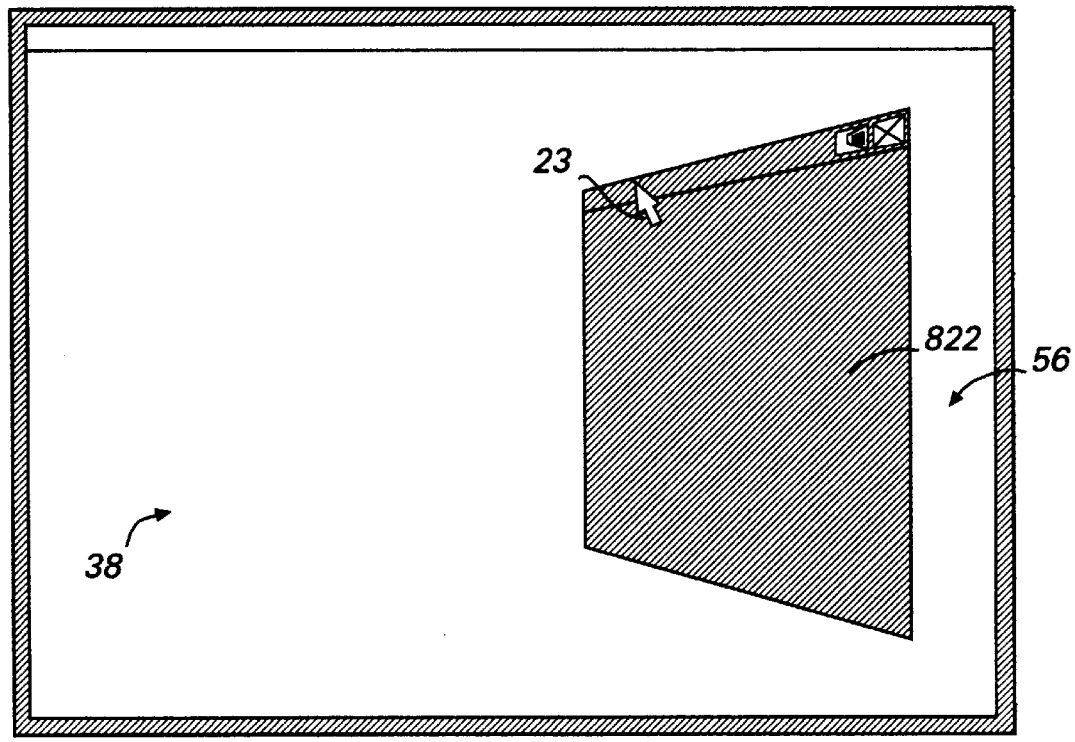
Figure 8C:
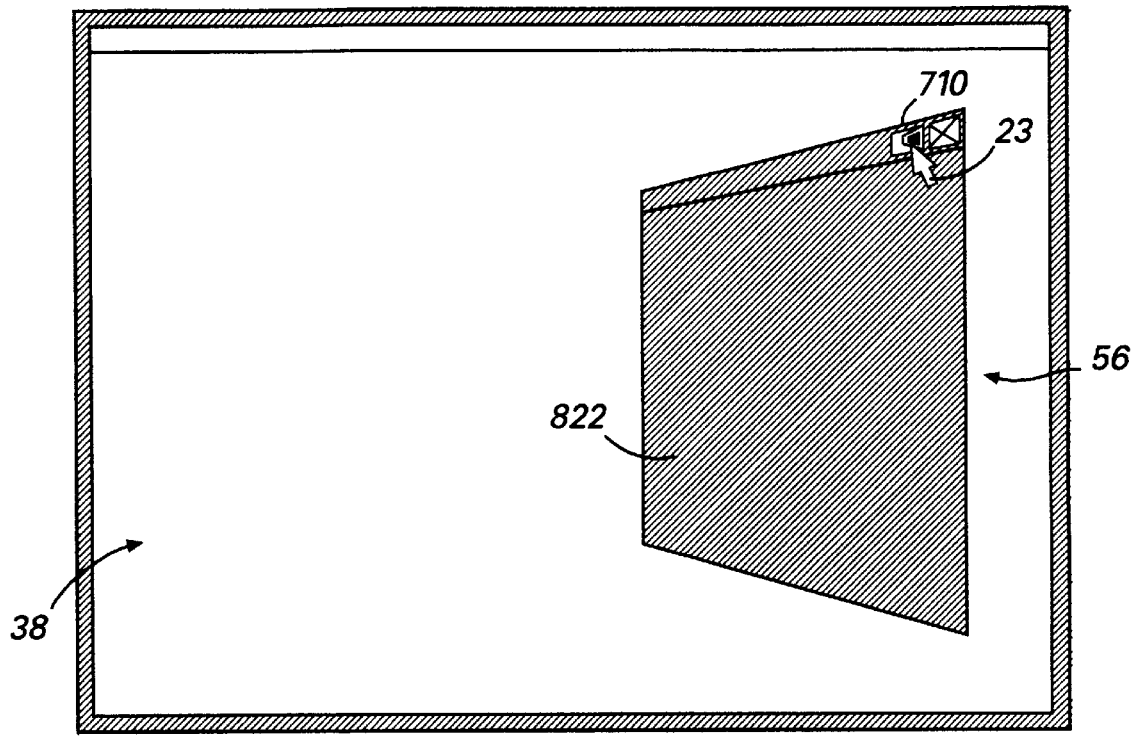
Figure 8D:
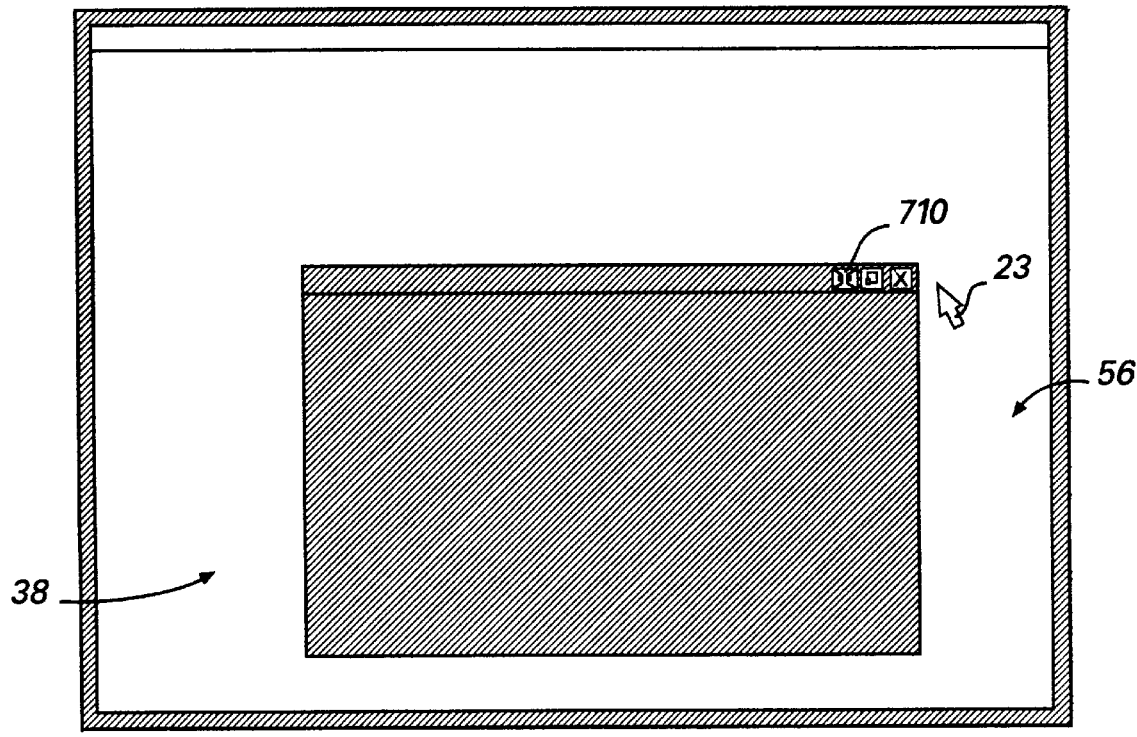

Referring to FIGS. 8A and 8B, the control method for positioning a window 822 on the right plane 56 using the window transform button 710 is shown. In FIG. 8A, a cursor 23 is positioned on the window transform button 710, and the user clicks and drags the cursor toward the right plane 38. When a user clicks and drags the cursor 23 towards the right plane 38 while the cursor 23 is positioned on the window transform button 710, a plane direction arrow 830 points towards the right plane 56. As discussed above, if the user desires to indicate or accept the computer's interpretation of the user's selection as indicated by the direction arrow 830, the user simply releases the selection mechanism of the cursor control, and the window 822 is positioned on the right plane 56 as illustrated in FIG. 8B. Referring to FIG. 8C, the method by which a user repositions the window 822 on the front plane 38 is illustrated. In order to reposition the window 822 on the front plane 38, the user clicks on the window transform button 710 and releases the selection mechanism of the control mouse. Upon release of the selection mechanism of the cursor control, the window 822 is repositioned on the front plane 38 as illustrated in FIG. 8D. A direction arrow is not displayed when the window is transformed from a perspective view. As discussed above in connection with FIGS. 4A–6C, the last plane information is saved.

Figure 9A:
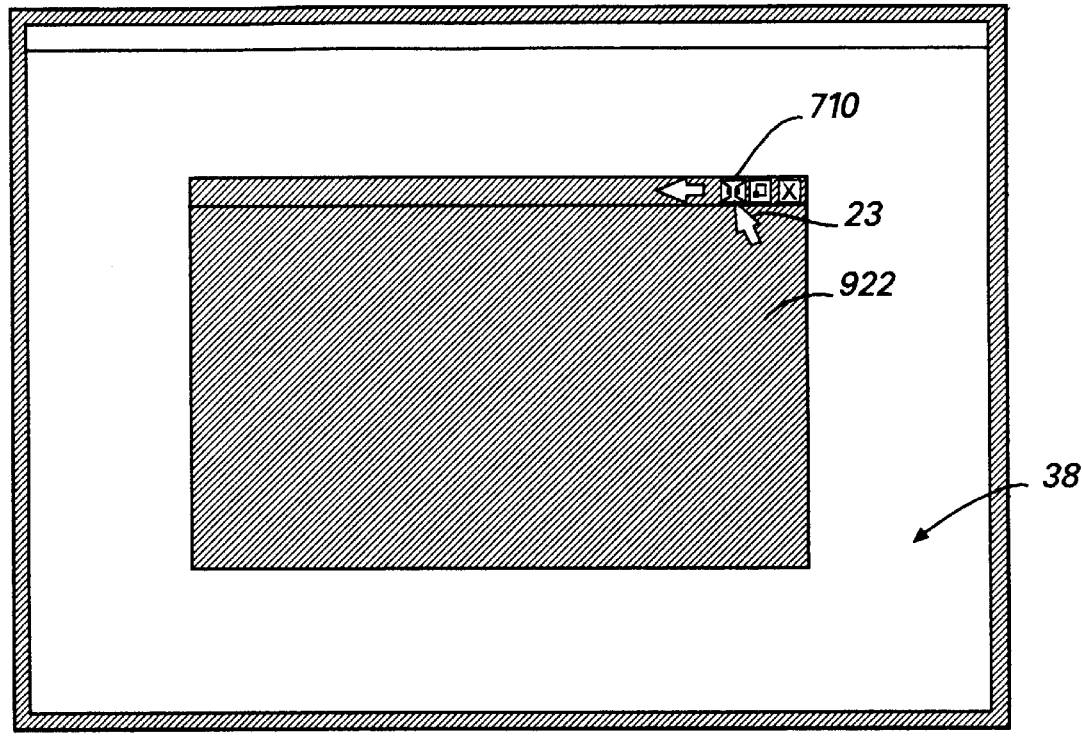
FIGS. 9a and 9b illustrate an alternate embodiment of a control mechanism for manipulation of displayed windows in accordance with the present invention.
Figure 9B:
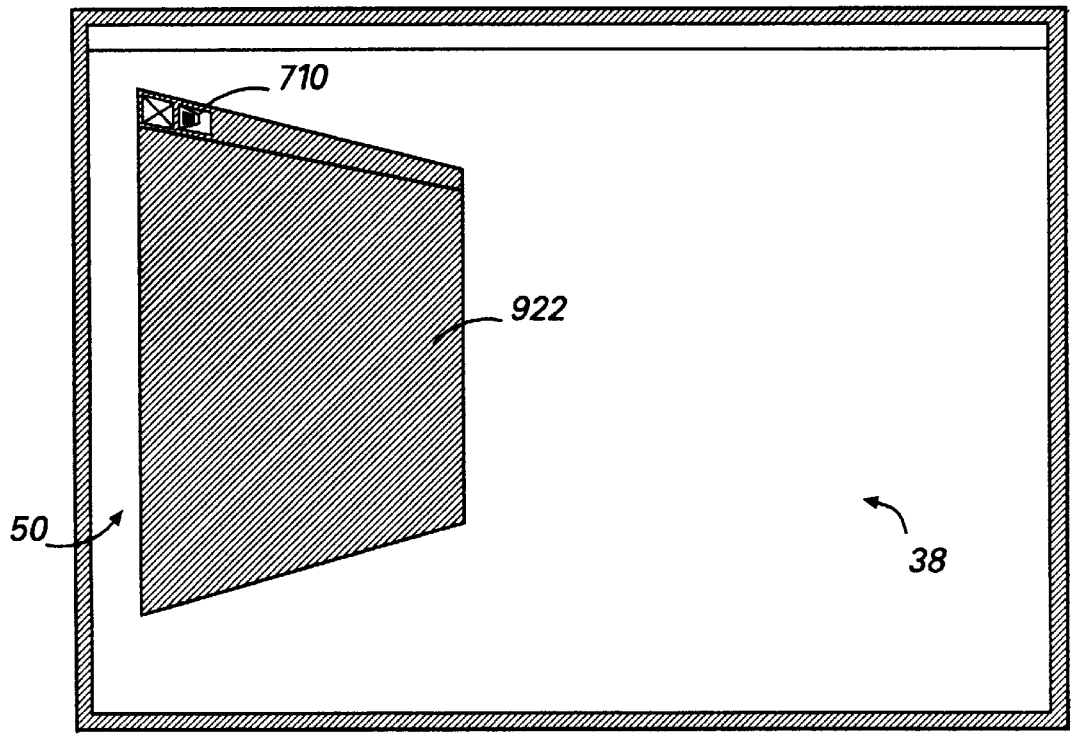

Referring to FIGS. 9A and 9B, the control method for positioning a window 922 on the left plane 50 using the window transform button 710 is shown. In FIG. 9A, a cursor 23 is positioned on the window transform button 710, and the user clicks and drags the cursor toward the left plane 50. When a user clicks and drags the cursor 23 towards the left plane 50, while the cursor 23 is positioned on the window transform button 710, a plane direction arrow 930 points towards the left plane 50. As discussed above, if the user desires to indicate or accept the computer's interpretation of the user's selection as indicated by the direction arrow 930, the user simply releases the selection mechanism of the cursor control, and the window 922 is positioned on the left plane as illustrated in FIG. 9B. The method by which a user repositions the window 922 on the front plane 38 is accomplished in the same manner discussed in connection with FIGS. 8C and 8D.

Figure 10A:
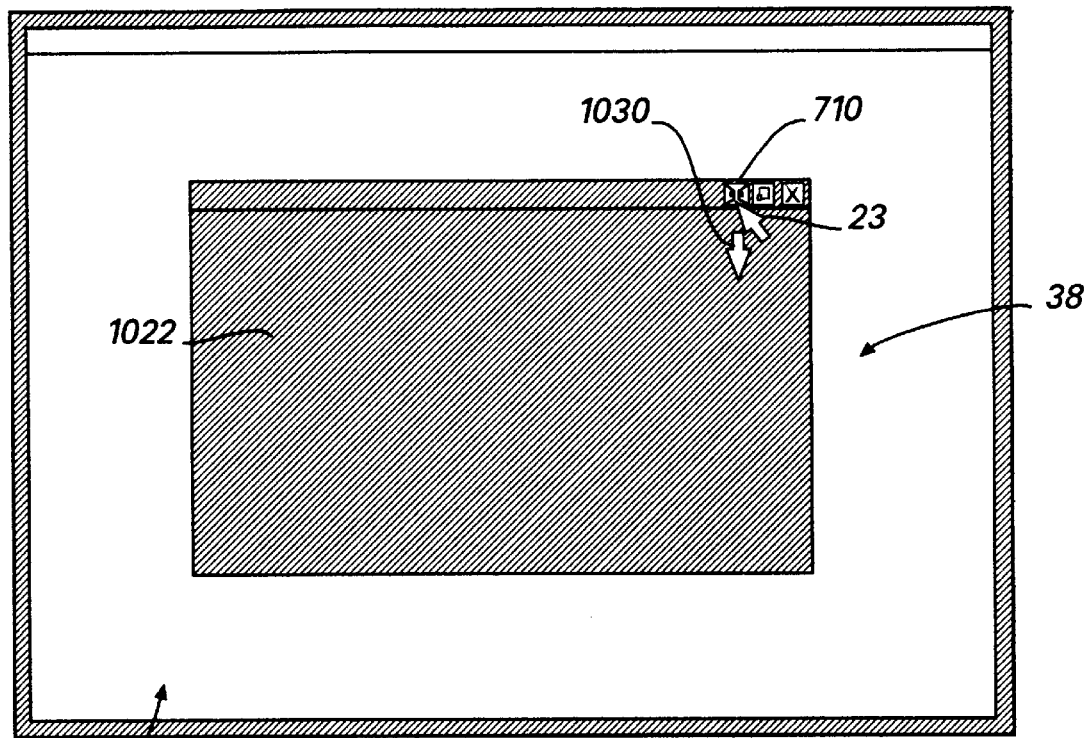
FIGS. 10a and 10b illustrate alternate embodiment of a control mechanism for manipulation of displayed windows in accordance with the present invention.
Figure 10B:
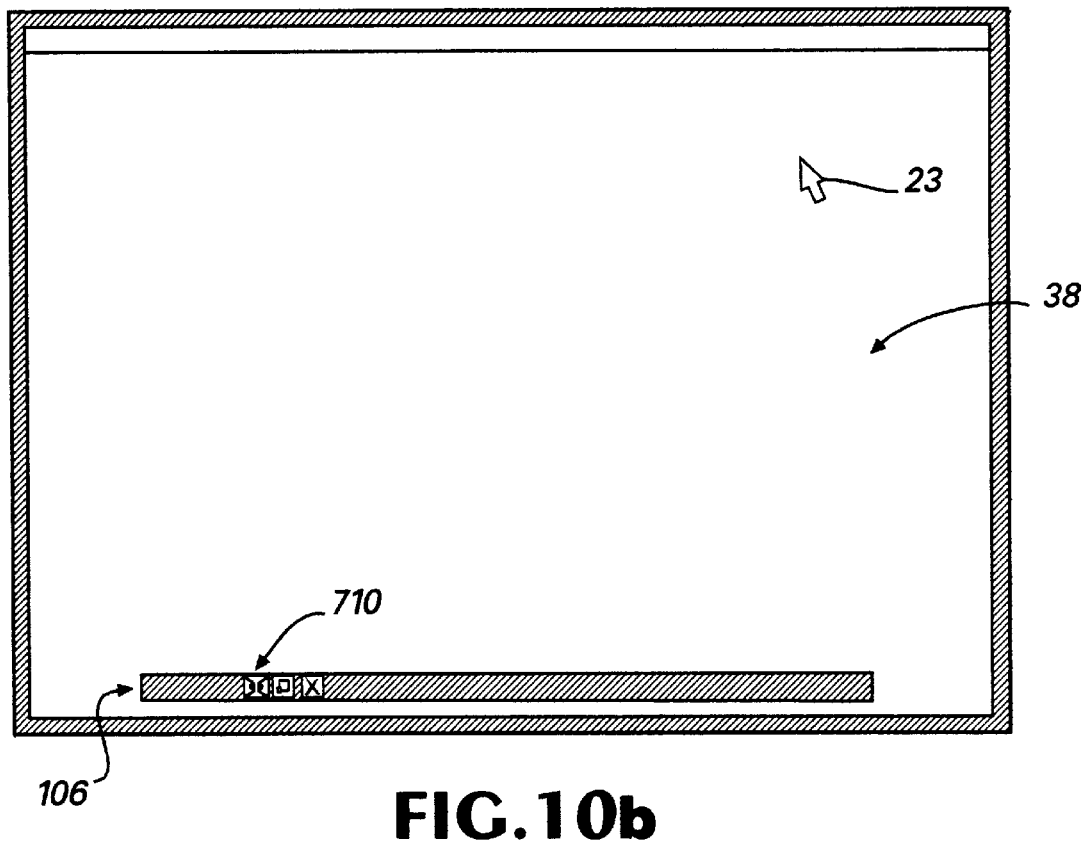

Referring to FIGS. 10A and 10B, the control method for positioning a window 1022 on the bottom plane using the window transform button 710 is shown. In FIG. 10A, a cursor 23 is positioned on the window transform button 710, and the user clicks and drags the cursor toward the bottom plane 106. When a user clicks and drags the cursor 23 towards the bottom plane 106, while the cursor 23 is positioned on the window transform button 710, a plane direction arrow 1030 points towards the bottom plane 1030. As discussed above, if the user desires to indicate or accept the computer's interpretation of the user's selection as indicated by the direction arrow 1030, the user simply releases the selection mechanism of the cursor control, and the window 1022 is positioned on the bottom plane 106 as illustrated in FIG. 10B. The method by which a user repositions the window 1022 on the front plane 38 is accomplished in the same manner discussed in connection with FIGS. 10C and 10D.

Planes and Boundaries for Three-Dimensional Windows

Figure 11:
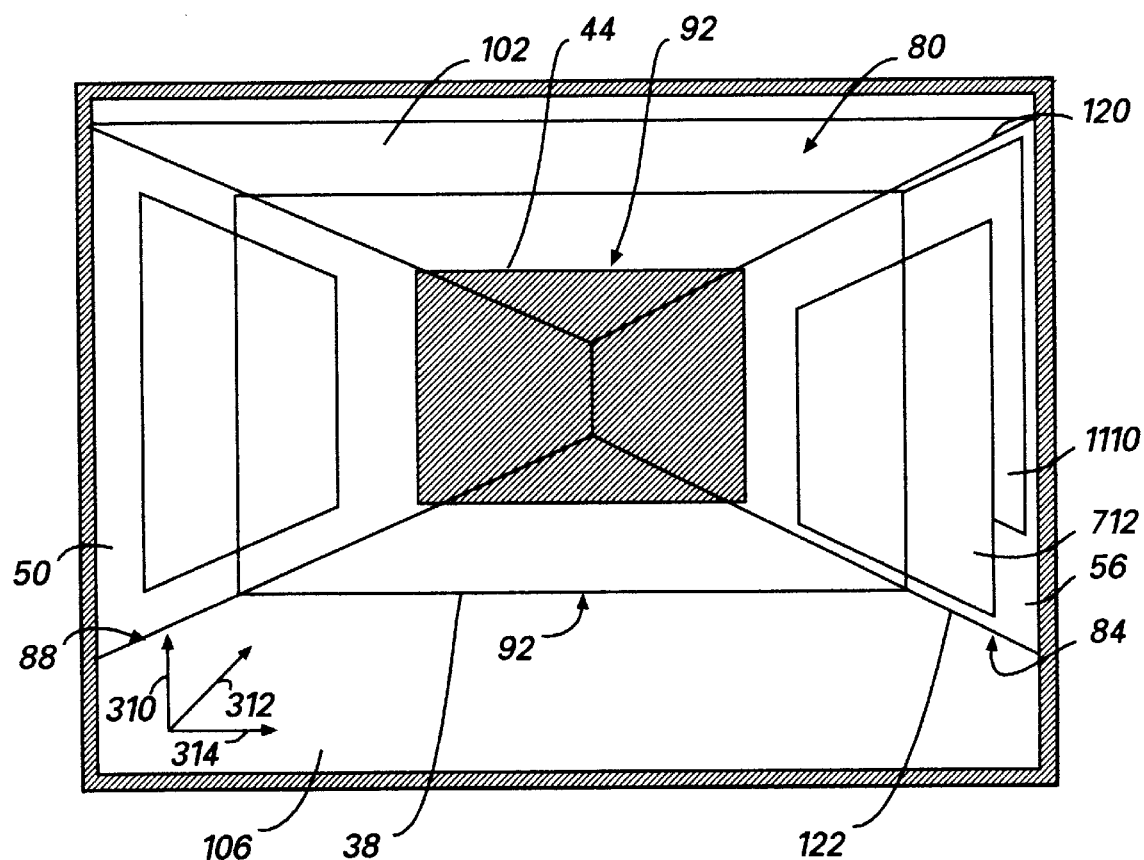
FIG. 11 illustrates lines demarcating areas for display of windows in accordance with the preferred embodiment of the present invention.

As noted above, window information is scaled and confined to certain areas on the display screen. Referring to FIG. 11, a system for defining the perspective transform based environment and for providing and defining the positions in which a window may be displayed is illustrated. A virtual isometric space system 80 provides a right plane quadrilateral 84, left plane quadrilateral 88, and back plane and front plane rectangles 92 and 96, respectively. The quadrilaterals and rectangles form the borders of a rectangular-prism or polyhedral isometric workspace. It should be appreciated that more or less complex surfaces may be used. The boundaries defining the rectangles or quadrilaterals are consistent with the predefined isometric space. The walls, ceiling and floor may be explicitly displayed on the display screen at the user's option. The plane based system constrains window shapes and sizes to the shape and sizes of the defined polygons. In this example, two walls, the right plane quadrilateral 84 and the left plane quadrilateral 88, and two depth planes, the front and back plane rectangles 92 and 96, respectively, define the three-dimensional space operative to display windows. It should be noted that the top and bottom planes 102 and 106 could also be used to display and transform windows. It should be appreciated three-dimensional workspaces may be created that are non-planer as discussed below.

The planes and geometry shown in FIG. 11 may be provided as the default geometry for the graphical interface 12. The system may provide the user with options to increase the depths and angles at which the basic geometry of the isometric workspace is defined. Preferably, the lines and shapes defining the boundaries of the three-dimensional workspace are not normally visible to the user, but during user customization, the lines demarcating the isometric space are made visible to the user. As noted above, the defined planes serve as a limit to the area in which a user may move a window on a particular plane or wall. For windows located in the perspective views or planes, the windows and text of the windows become smaller as the text approaches the line or point defined along the back edge of the plane. Generally, the point where objects appear smaller as the objects are positioned closer to the point is termed the vanishing point. The vanishing point may be defined in memory for the display system. As illustrated, the window 1110 may not extend or be placed above the upper edge 120 of the right plane quadrilateral 84. Similarly, the window 712 may not be positioned below the lower edge 122 of the right plane quadrilateral 84. The present invention may be implementing in a manner that reflects the depth of any object as a function of the objects location in the defined isometric room or three-dimensional workspace.

It should be appreciated by those skilled in the art that the user viewpoint of the windows may be changed. Changing the user's viewpoint may be accomplished by changing the defined depth of the user relative to the windows (in the z-direction). Thus, moving the virtual location of the user from "in front" of the planes workspace, and moving the user into the workspace, allows the system to be used as an immersive interface with standard head tracking as used with a head mounted display.

As known to those skilled in the art, a display screen may be divided into m by n elements generally known as pixels. A portion of the computer memory 20 is organized as a rectangular array of elements to represent the pixels of the display screen. The pixels as defined by the computer memory 20 may be addressed in terms of Cartesian coordinates (x, y) corresponding to each pixel. More specifically, for the planes, the computer system may store a set of Cartesian coordinates which identify the memory area for the planes. Those skilled in the art will appreciate that the boundaries defining the isometric room 80 can be readily established to provide the desired dimensions.

As discussed above, the display screen 15 may be divided into m by n elements which are organized as rectangular array of elements in computer memory 20 and addressed in terms of (x, y) coordinates. Thus, lines or points defining the isometric room may be selected based on the (x, y) coordinates of the picture elements as represented in memory 20. When the desired points, lines, or shapes are selected for creating the planes, the location of the memory elements which correspond to the selected boundaries of the planes in (x, y) coordinates of the display buffer can be stored. The stored boundaries may be then referenced in execution of the steps of the present invention in order to provide defining or constraining regions for which a window located on a plane may be displayed. Well known methods of referencing a window being moved within the constraining boundaries of a display may be implemented to limit the movement of windows within the defined isometric space boundaries. The isometric room is defined as a set of perspective-transform objects. An isometric room is constructed by creating four objects of the class "perspective-transform". A first perspective-transform object's rotation is set to 90 degrees. The first perspective-transform object now has the transformation information for the left perspective-transform. A second perspective-transform object's rotation is set to −90 degrees. The second perspective-transform object also has it origin transformed so that it becomes the right perspective-transform. A third perspective-transform object has its origin set so that it becomes the back perspective-transform. The fourth perspective-transform object has no modifications to its origin or rotation and is thus the front perspective-transform. The size of each perspective-transform is a function of the display resolution that is used on the display monitor.

Windows are constrained to a perspective-transform by code in the window class that checks the coordinates of the window against the coordinates of the containing perspective-transform. If an attempt is made to move or size a window beyond these boundaries, the window adjusts the coordinates to be within the boundaries of the containing perspective-transform.

The front and back perspective-transform share x and y coordinates. The left and right perspective-transforms have a different x, y position for each perspective-transform. By using different x, y positions for the left and right perspective-transforms, the user can position a window closer when on left perspective-transform than when it is on the right perspective transform. This x, y coordinate information is stored in separate member variables within the window class. This coordinate information can be within the perspective-transform itself and thus a window would not directly know where it is located in two-dimensional space. The window would only have information stored about its width and height. As those skilled in the art will understand, the stacking or overlaying of windows in the three-dimensional environment of the present invention is generally handled in the same manner as a conventional window display environment. However, as noted herein, a window is placed, in the z-position, in the first available slot of a z-order list of the perspective-transform selected. With the present invention, windows on the front perspective-transform 38 remain fully visible on the display screen when the window on the front perspective-transform 38 intersects data from a window displayed on a side perspective transform.

Figure 12:
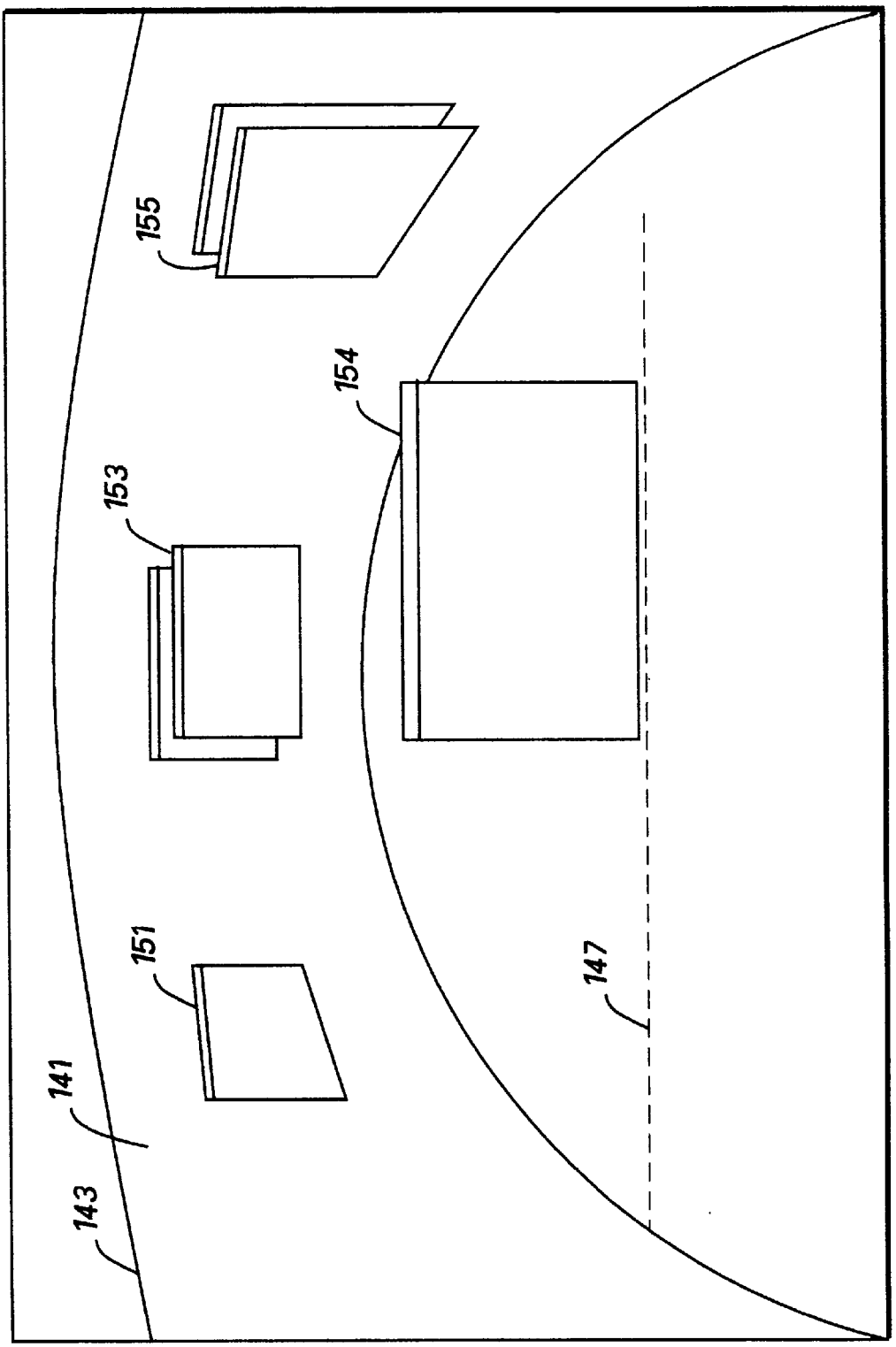
FIG. 12 illustrates a non-planar bounding surface for defining a three-dimensional workspace.

Referring to FIG. 12, a non-planar bounding surface 141 for defining three-dimensional depth perception is shown. The bounding surface 141 is defined as a half sphere whose rim 143 meets the front bounding plane 147. Windows 151, 153, and 157 are shown transformed to conform to the shape defined by the bounding surface 141. The windows 151, 153, and 155 are transformed to their respective shapes with transformation matrices according to the window position defined by the bounding surface 141. Those skilled in the art will appreciate that many other shapes of bounding surfaces may be defined for use as a bounding surface to provide three-dimensional graphics to a window based user interface.

Multiple Three-Dimensional/Isometric Workspaces

Figure 13:
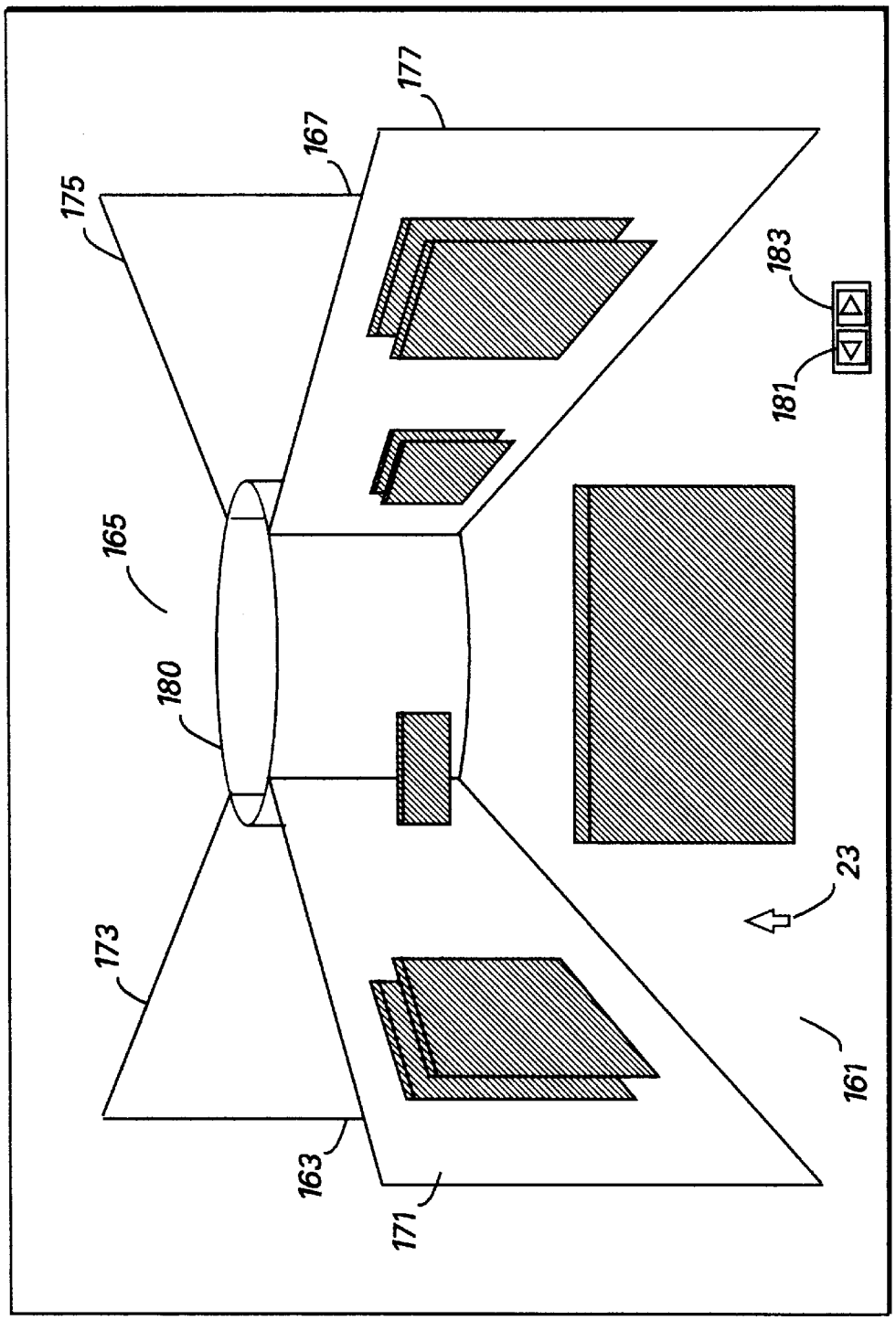
FIG. 13 illustrates multiple isometric spaces constructed according to an embodiment of the invention.
Figure 14:
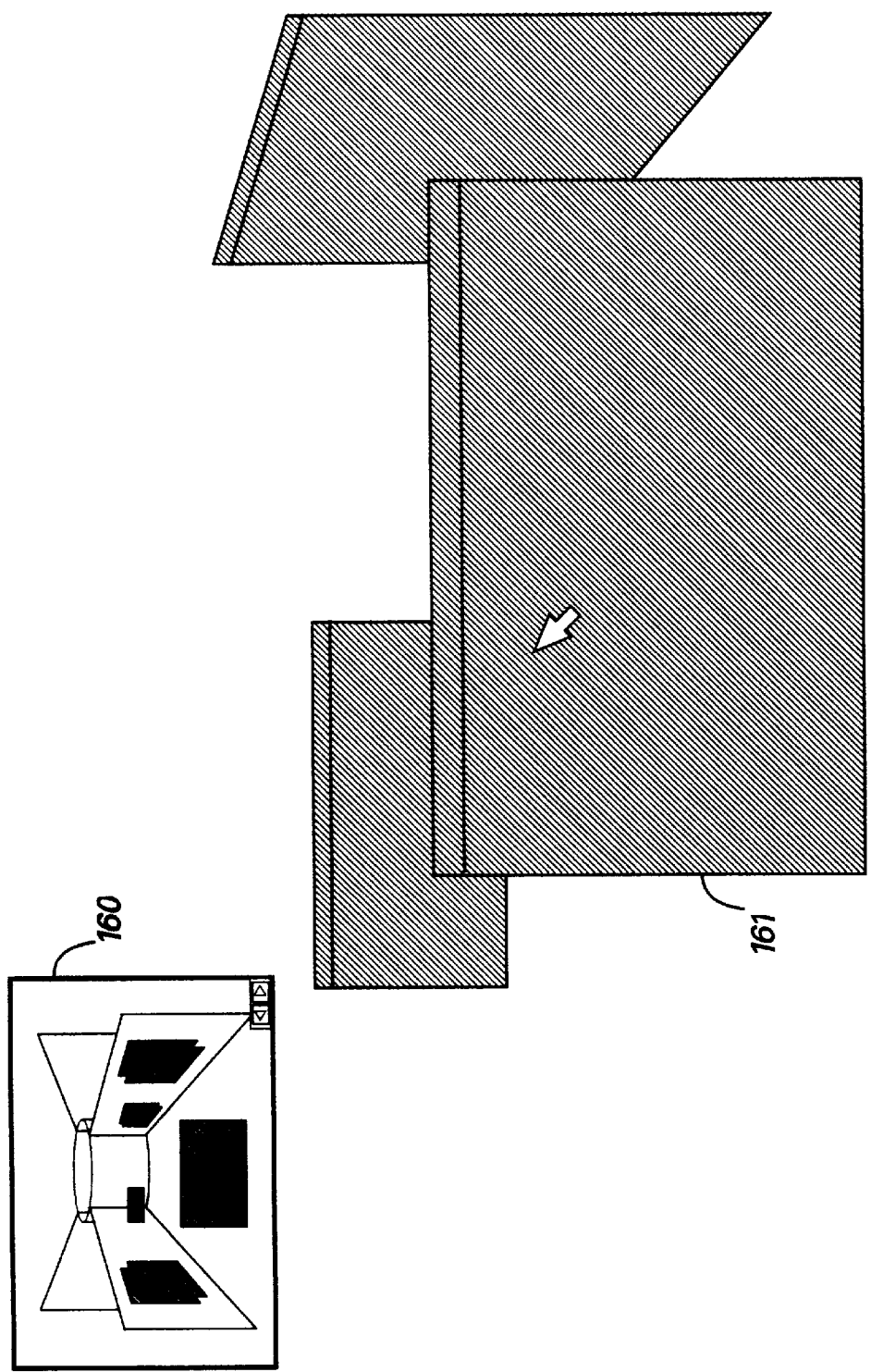
FIG. 14 illustrates an alternate view of the multiple isometric spaces.

Referring to FIG. 13, another system for defining the perspective-transforms based environment and for providing and defining the positions in which a window may be displayed is illustrated. A virtual isometric space system 160 defines multiple isometric spaces 161, 163, 165, and 167. Separating boundary planes 171, 173, 175, and 177 separate the multiple isometric spaces 161, 163, 165, and 167. The separating boundary planes 171, 173, 175 and 177 intersect a non-planar bounding surface 180. The non-planar bounding surface 180 is cylindrical in shape. It should be appreciated that the non-planar bounding surface may vary in shape. Each isometric space 161, 163, 165, and 167 may contain a set of planes and windows at various positions and configurations, consistent with their position in each isometric space, as discussed above with the single isometric space. A user can view a single space at a time such as the single space 161. A user can access the space directly by placing the cursor 23 in a selected isometric space and providing a selection single when the cursor is positioned in the selected space. Alternatively, the user can rotate to a selected isometric space by selecting isometric space selection controls 181 or 183. The isometric space selection controls 181 and 183 operate to rotate through the isometric space as indicated by an arrow on the controls. It should be appreciated that animation effects may be displayed during transitions between the isometric spaces 161, 163, 165, and 167. Referring to FIG. 14, a global view of the isometric space system 160 is shown in the upper right hand corner of FIG. 14. The windows in the foreground of FIG. 14 is the isometric space 161.

Cursor Operation

As discussed above, the computer system of the preferred embodiment of the present invention provides depth cues to the windows. As also discussed above, a cursor is used to designate or select certain control items within the preferred embodiment of the present invention. To further enhance the depth cues of the display system utilized with the present invention, the computer system of the present invention dynamically sizes the cursor according to the window on which the cursor is positioned and/or the position of the cursor on a window. The cursor size reflects the depth of the location of the cursor in the defined isometric space. The preferred embodiment of the present invention considers a location of the cursor to be on the surface of the plane occupied by the window, whether the cursor is positioned in a normal, nonperspective transformed window, a perspective transformed window, or a zoomed out window.

Figure 15:
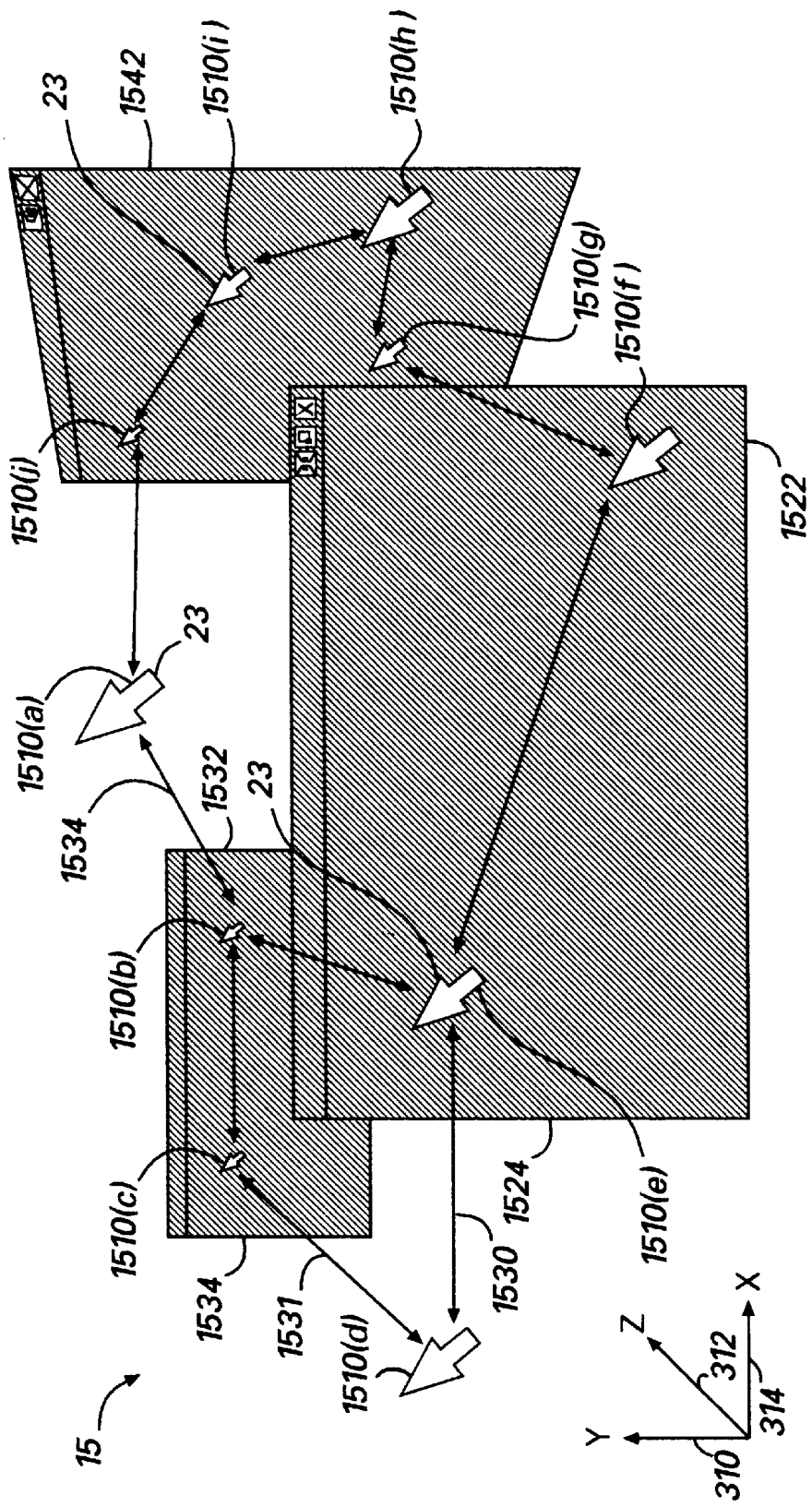
FIG. 15 illustrates the method of dynamically sizing the cursor of the present invention.

Referring to FIG. 15, the dynamic cursor sizing operation of the preferred embodiment of the present invention is illustrated. The computer system of the present invention dynamically sizes the cursor 23 by automatically changing the size of the cursor 23 when the cursor 23 moves along a transformed window, "toward" or "away" from the user, when the cursor moves across a window border to another window, or when the cursor moves from a window to a non-window area of the display screen. The computer 16 (FIGS. 1 and 2) determines the location of the cursor 23 on the display screen 15 as known to those skilled in the art, then resizes the cursor 23 to a predetermined size for the cursor 23 based on the particular location of the cursor on the display screen 15 and/or based on whether the cursor is positioned on a window at the cursor location. The cursor 23 is at its largest when it is not positioned on a window. Although multiple cursors 23 are illustrated in FIG. 15, those skilled in the art should appreciate that generally only one cursor is displayed at a time. The multiple cursors 23 illustrated in FIG. 15 represent different positions 1510 of the cursor 23 on the display screen 15.

For example, the dynamic sizing of the cursor 23 may occur as follows. The cursor 23 at position 1510(a) is considered to be "not positioned on a window". When a cursor 23 is moved from position 1510(a) to position 1510(e) on the nontransformed window 1522, the computer system reduces the size of the cursor 23 at position 1510(e) as compared to the cursor position 1510(a) which is not on a window. By reducing the size of the cursor 23, the computer system indicates that the position of the cursor 23 is further back in the display system. When the cursor 23 is moved from position 1510(e) to either position 1510(b) or 1510(c) on the zoomed back window 1532 the cursor 23 becomes even smaller. When a cursor 23 is positioned on a window or plane that is perpendicular to the user's view or appears straight ahead in the user's line of view, the cursor size within the window that is perpendicular to the user's view remains the same. For example, the size of the cursor 23 located at position 1510(e) and the size of the cursor 23 at 1510(f) are the same. The size of the cursor 23 located at positions 1510(a) and 1510(d) which are not positioned on a window or positioned in an open space are the same. The open space is considered to be perpendicular to the user's line of view. Also, as indicated at positions 1510(b) and 1510(c), the cursor's size is the same along the zoomed back view of window 1532. Generally when the cursor is located at the same z-position along a perspective transform or plane as determined by the computer, the cursor size appears to be the same on the display screen 15.

As noted above, the size of the cursor 23 automatically changes when it crosses from and to objects located on different planes. By changing the size of the cursor 23 as it passes across the border 1524 of window 1522 along the path 1530, the cursor 23 appears to snap to, jump to, or move to a different plane. Similarly, when the cursor 23 moves from position 1510(d) and across the border 1534 of window 1532 along the path 1531, the cursor appears to snap to the window 1532 when it decreases in size as illustrated at position 1510(c). The size of a cursor automatically snaps to or resizes when the cursor 23 crosses the border of a window to another window or open space to indicate another depth level defined in the display system of the computer system.

Similar to the dynamic resizing of the cursor 23 as it crosses the border of a window to a different window or to open space, the cursor 23 is dynamically resized as the cursor 23 is moved along a perspective transformed window in the z-direction. When the cursor 23 is moved on perspective transformed windows, such as window 1542, the size of the cursor 23 is dictated by the position of the cursor 23 and the location of the window. When the cursor 23 is moved "away" from the user such as along the z axis in FIG. 15, the size of the cursor 23 decreases. For example, the size of the cursor 23 on the window 1542 at position 1510(h) is larger than the size of the cursor 23 located at position 1510(i). Further, the size of cursor 23 located at position 1510(j) is smaller than the sizes of the cursor 23 located at positions 1510(i), 1510(g), and 1510(h) on the window 1542. Thus, in accordance with a method of the present invention the size of the cursor 23 decreases in the direction away from the user.

In addition to the resizing as discussed above, the speed or animation of cursor transitions between windows at different depths may vary depending on the relative distance between transitions between windows. A cursor transition between windows can be considered an animated jump. The animated jump may be characteristically different when jumping up from a more distance window in the three-dimensional space than when jumping down from a window that is closer to the user. Animated jumps of the cursor may also have a characteristic sound associated with transitions of various distances or depths in the three-dimensional space.

Object-Oriented Programming for Three-Dimensional Windows

As noted above, window display systems preferably are implemented with object-oriented programming, Preferably, classes are implemented for all of the major functional pieces of the interface. Application programming interfaces (API's) that provide three-dimensional transforms are preferably used. The following description discusses the implementation of objects used with the present invention and how the different objects interact with each other. The following is a description of the classes that are utilized with the present invention.

With respect to the interface, the basic building block is preferably a group. A group consists of a right and left perspective transform as well as a front and back perspective transform. As discussed herein, only one group is utilized, but this is an implementation detail and not a limitation of the system. Multiple groups may be used. Groups have no visible portions. Groups only affect the location of the perspective transforms that make up the group.

Perspective transforms, as discussed herein, are generally an invisible part of the interface that affect the display of windows that are attached along the predefined boundaries of the computer screen workspace. Perspective transforms apply any existing transformation information to the drawing context before requesting all contained objects to draw themselves into the drawing context. When the scene is rendered, the group object notifies each perspective transform object in turn to render itself through the user of a draw function. Internally this draw function makes a set of calls to set the current transformation matrix to the desired matrix. For example, the left perspective transform sets the matrix so that all drawing commands are rotated 90 degrees counter clockwise so that a line being drawn from left to right will appear to go away from the observer into the screen. After the perspective transform object has set the transformation matrix it then calls the draw function for each of its contained objects. Normally these objects are window objects that only know how to draw in two dimensions. Because the transformation matrix has rotated everything the window will appear to draw in three dimensions. Also the perspective transform object will adjust the transformation matrix after each contained object has been drawn so that the objects appear stacked on top of each other. Perspective transforms also utilize a z-order stacking as discussed above to make sure that all of the contained windows are drawn without overlapping visualizations.

As noted above, the operating system of the present invention uses windows extensively as part of the display system. Windows generally only have graphical information about their location in two-dimensional space (even though the underlying object class stores origin information for x, y, and z coordinates) and some state information necessary for proper restoration from a perspective transformed position. A window may need to store state information about the last perspective transform to which the window was attached so that the window can be returned to the appropriate perspective transform when the same perspective-transform button is selected twice. For example, if a window is currently on the front perspective transform, and the perspective-transform left button is selected, the window will be moved to the left perspective transform. The window stores an indication that it is leaving the front perspective transform so if the perspective transform left button is selected again the window can be attached to the front perspective transform again. The information about a window's two-dimensional location could all be stored at the perspective transform level with a dictionary using the window object as the key and storing the two-dimensional location of the window on the perspective transform as the value. When a window is removed from either the front or back perspective transform, the perspective transform is saved so that the window can be reattached when one of the other positioning controls is activated. The windows display themselves in response to requests from the owning perspective transform. Windows also request the controls that are contained to draw themselves.

A client area class is used to represent the client area of a window. The client area is where an application performs its drawing. The API's are used to implement the drawing and use display lists to optimize the drawing. Display lists provide a technique of preprocessing a sequence of drawing instructions and then referencing during the instructions through an integer identification. All visible components of the interface have an associated display list. In the case of the controls (system menu, title bar, pushback, perspective-transform left and perspective-transform right) a single display list is used that is a static member of the respective class. All windows have a display list for their border and all client area instances use a display list to store the drawing code necessary for displaying themselves.

In order to optimize the drawing code when an object is in motion, a technique known as "scissoring" is used. This technique involves finding the minimum rectangular region of pixels that need to be refreshed and limiting the drawing to that set of pixels. Scissoring is a general name for a technique of clipping the drawing to a specific set of pixels. Scissoring is also known as marking.

Display Processing Steps

Figure 16A:
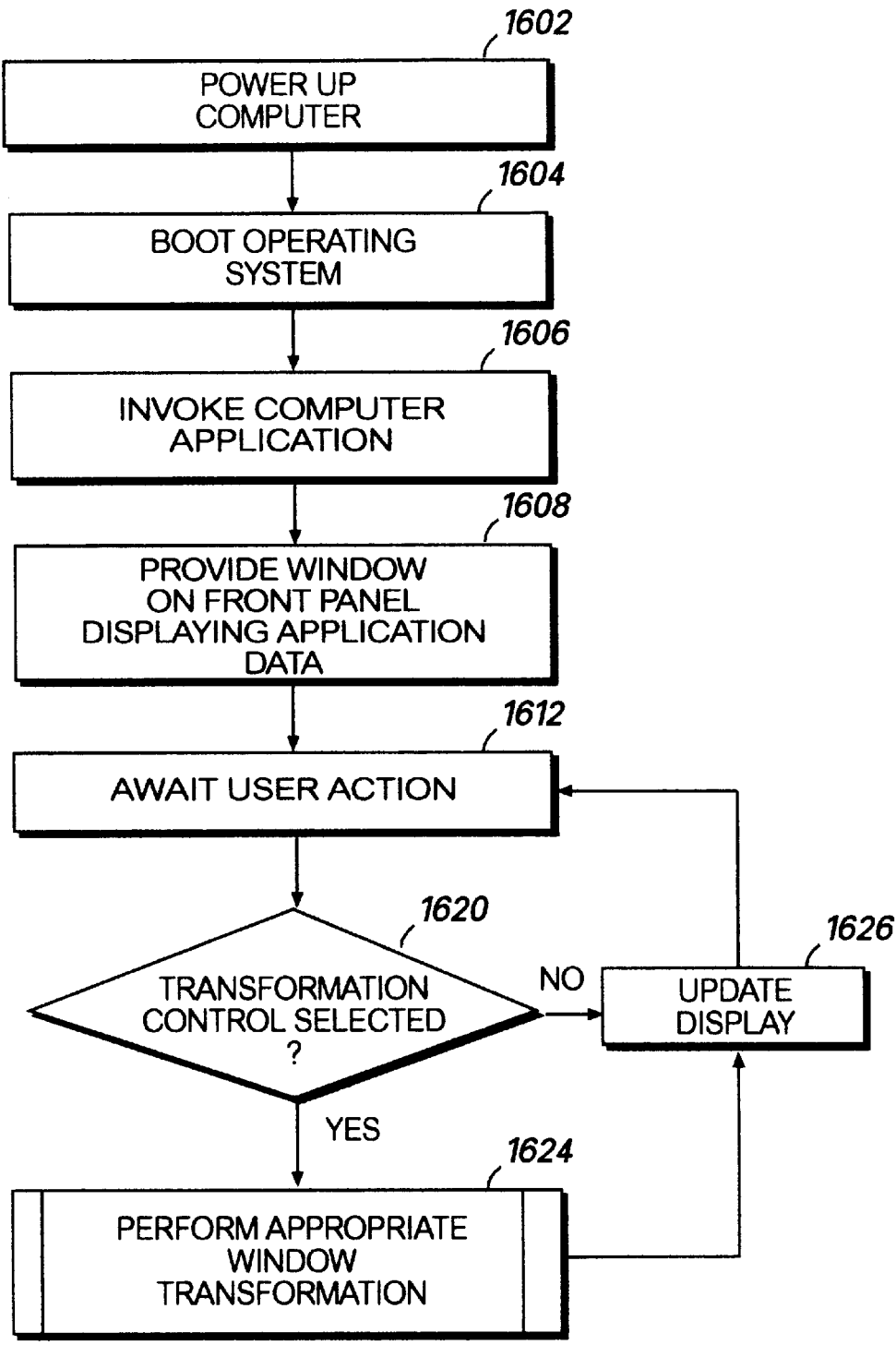
FIGS. 16a and 16b are flow diagrams showing the steps implemented in the preferred embodiment of the present invention.
Figure 16B:
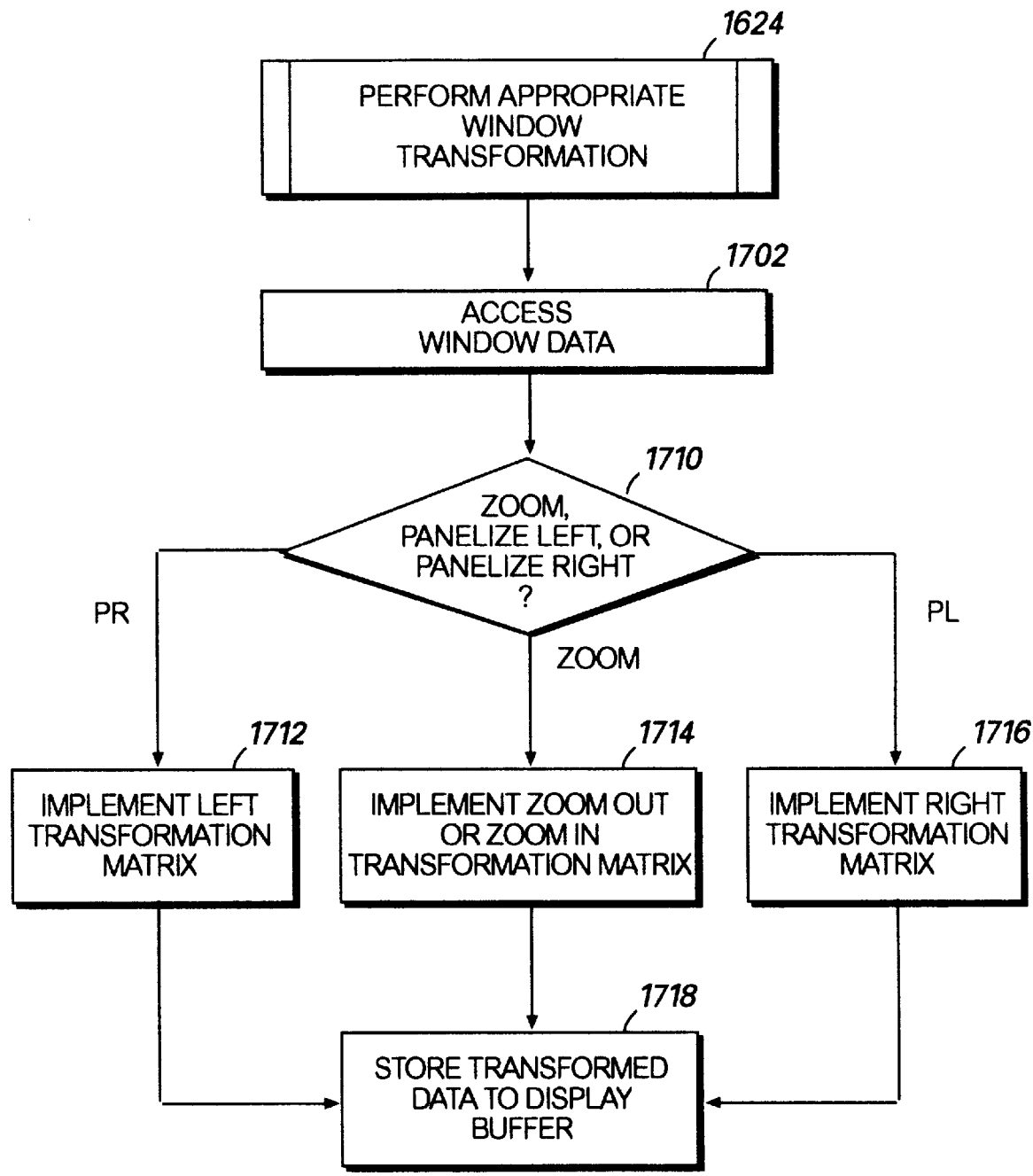

The preferred steps of the method for displaying or simulating a three-dimensional operating system are shown in FIGS. 16a and 16b. As noted above, information for displaying a window is received from a computer application and is displayed by manipulating conventional rectangular coordinate information to redraw the data on the computer screen using selected depth cues. The steps of the preferred method are implemented with a computer program operating on a general purpose computer such as the computer system 10 in FIG. 1. It will be appreciated that conventional software development techniques are used for developing the computer program implemented in conjunction with the present invention. The preferred steps will be discussed in conjunction with FIGS. 1 and 2.

Referring to FIGS. 1, 2, and 16a, the processes implemented in conjunction with the present invention are shown. At step 1602, the computer system 10 is powered up, and the operating system of the present invention is booted at step 1604. At step 1606, a computer user may invoke an application, or a routine specified during the system boot procedure may invoke an application. When an application is invoked, at step 1608, the window display system of the present invention displays the application data on the front perspective transform. At step 1612, the CPU 22 waits for a command from a computer user. When a command is received at the CPU 22, the process proceeds to step 1620. At step 1620, a determination is made as to whether the user command was a window transformation control or standard user command. If the command entered was a standard command, the display screen 15 is updated, at step 1626, by the CPU 22 according to the standard command. The process then proceeds to step 1612 to await another user command. If, however, at step 1612, the user selected a window transformation command, such as Push back 64, perspective-transform left 66, or perspective-transform right 68, the process proceeds to step 1624 where the appropriate window transformation is implemented.

Referring additionally to FIG. 16b, the discussion of the preferred processes of the present invention is continued. At step 1702, the appropriate window data is accessed as discussed above. At step 1710, the CPU 22 determines whether the transformation command was a push back (zoom back) 64, perspective-transform left (PL) 66, or perspective-transform right (PR) 68 command. If the command was a push back 64 command, the process proceeds to step 1714 where the appropriate zoom function is implemented as discussed above. If the command was a perspective-transform right 66 command, the process proceeds to step 1712 where the perspective-transform right function is implemented as discussed above. If the command was a perspective-transform left 66 command, the process proceeds to step 1716 where the perspective-transform left function is implemented as discussed above.

In summary, the preferred embodiment of the present invention provides a three-dimensional virtual workspace for window based display systems. The display system of the present invention is an isometric display system for an operating system. The isometric display system provides a display with monocular depth cues by making automatic sizing and geometric transformations on two dimensional rectangles that define traditional windows.

The isometric display system performs geometric transformation operations on rectangular windows to convey the impression to the user that the windows are positioned in a three-dimensional space. The impression of depth and of working in a three-dimensional space are created by transforming two-dimensional windows to appear as if the two-dimensional windows are embedded at orientations and positions in a three-dimensional isomeric space. The isometric display system responds to user activation of control buttons by transforming the shape and orientation of windows consistent with the defined three-dimensional space.

The preferred embodiment of the present invention provides left, right, front, and back planes or perspective transforms within the display system that operate to display an application or window on a user selected plane. The planes are preferably organized or defined as the walls of a four-sided room as seen when viewing the room from the outside. The planes defining the three-dimensional room or space are shaped to provide depth perception within the display monitor. The left and right planes narrow in dimension as viewed from the front to back of the space defined on the display screen. Additionally, the front plane appears closer to the user than the back plane. The planes are preferably not visible but when a plane is selected by a user to display a window, the window's shape and contents are transformed or rescaled to conform to the shape of the planes. The simulated depth perception is created by transforming designated windows so that they conform to the dimensions of the respective plane or position on which the window is designated for display. The contents of displayed windows may be generally viewed in full when the windows are hung on different planes.

The foregoing relates to the preferred embodiment of the present invention, and many changes may be made therein without departing from the scope of the invention as defined by the following claims.

We claim:

1. In a computer system having an operating system operative to display computer application data in a window on a display monitor, said windows having sides defining an enclosed area for presenting said data on said display monitor, said computer system characterized by resources including a central processing unit (CPU), a memory, and display monitor said resources communicating via a system bus, said CPU operative to control processes for defining the size and shape of displayed windows, a method for resizing sides defining the area of the window, comprising:

defining an isometric work space on said display screen;

displaying a window of information in said isometric work space on said display screen, said window having a first geometrical shape;

providing a first transformation control in said isometric work space, for said display system, for transforming said window of said operating system to a second geometrical shape in said isometric work space; and upon selection of said first transformation control, transforming said window to said second geometrical shape in said isometric work space, said CPU and said control processes in response to said selection of said first transformation control being capable of performing a three-dimensional transformation of said first geometrical shape to produce said second geometrical shape.

2. The method of claim 1 wherein said window contains data symbols and said method further comprising rescaling the size of said data symbols upon selection of said first transformation control.

3. The method of claim 2 wherein rescaling said data symbols rescales said data symbols to a size proportionate to the transformation of the shape of said second geometrical shape.

4. The method of claim 1 further comprising providing a second transformation control in said isometric work space for transforming said window of said operating system to a third geometrical shape in said isometric work space; and upon selection of a second transformation control, transforming said window to said third geometrical shape in said isometric work space.

5. The method of claim 4 wherein said window contains data symbols and said method further comprising rescaling the size of said data symbols upon selection of said second transformation control.

6. The method of claim 4 wherein rescaling of said data symbols rescales said data symbols to a size proportionate to the transformation of the shape of said third geometrical shape.

7. The method of claim 1 wherein transforming said window to a second geometrical shape comprises transforming said window to a geometrical shape that conveys depth perception to said window in said isometric work space.

8. The method of claim 7 wherein transforming said window to a second geometrical shape comprises decreasing the dimensions of at least one of the sides defining the boundary of said window.

9. A computer system operative to display computer application data in a window on a display monitor, said windows having borders defining and enclosed area for presenting said data on said display monitor, comprising:

resources including:
a central processing unit (CPU); a memory; a display monitor, and a system bus, said resources communicating via said system bus; and
said CPU having an operating system operative to partition the display screen of said display monitor into a plurality of preselected areas for displaying windows of multiple applications in an isometric work space, each window having a first geometrical shape, and said CPU operative to confine selected ones of said displayed windows to selected ones of said partitioned areas in said isometric work space, said operating system being capable of performing a three-dimensional transformation of each first geometrical shape to produce a respective second geometrical shape within a respective partitioned area.

10. The computer system of claim 9 wherein said CPU is further operative to transform the borders and data of a selected window to predetermined shapes upon selection of a partitioned area designated to display said selected window in said isometric work space.

11. A computer-usable object, which when stored in a computer memory, manipulates the boundaries and data of a displayed window in an isometric work space on a display monitor, said object comprising:

computer-readable code including:
(a) a data structure for allocating storage for a data representation of the window having a first geometrical shape in said isometric work space and the data of said window; and
(b) a member function for transforming said data representation of said window to data representation of a second geometrical shape for said window in said isometric work space, said second member function being capable of performing a three-dimensional transformation of said data representation to produce said second geometrical shape.

12. In a computer system having an operating system operative to display computer application data in a window on a display monitor, said windows having sides defining an enclosed area for presenting said data on said display monitor, said computer system characterized by resources including a central processing unit (CPU), a memory, and display monitor said resources communicating via a system bus, said CPU operative to control processes for defining the size and shape of displayed windows, a method for resizing sides defining the area of the window, comprising:

defining an isometric work space on said display screen;
displaying a window of information in said isometric work space on said display screen having a first geometrical shape;
providing a first transformation control in said isometric work space, for said display system, for transforming said window of said operating system to a second geometrical shape in said isometric work space, said first transformation control being capable of performing a three-dimensional transformation of said first geometrical shape to produce said second geometrical shape; and
upon selection of said first transformation control, providing an indication of the geometrical shape in said isometric work space that said transformation control will render.

13. The method of claim 12 wherein providing an indication comprises providing a pointer that points to a location on said display screen designated to display said window in a particular shape in said isometric work space.

* * * * *